US011959898B2

(12) United States Patent
Tate

(10) Patent No.: US 11,959,898 B2
(45) Date of Patent: Apr. 16, 2024

(54) IDENTIFICATION AND SCORING OF RELATED COMPOUNDS IN COMPLEX SAMPLES

(71) Applicant: DH TECHNOLOGIES DEVELOPMENT PTE. LTD., Singapore (SG)

(72) Inventor: Stephen A. Tate, Barrie (CA)

(73) Assignee: DH Technologies Development Pte. Ltd., Singapore (SG)

( * ) Notice: Subject to any disclaimer, the term of this patent is extended or adjusted under 35 U.S.C. 154(b) by 449 days.

(21) Appl. No.: 17/259,143

(22) PCT Filed: Aug. 15, 2019

(86) PCT No.: PCT/IB2019/056937
§ 371 (c)(1),
(2) Date: Jan. 8, 2021

(87) PCT Pub. No.: WO2020/044161
PCT Pub. Date: Mar. 5, 2020

(65) Prior Publication Data
US 2022/0365046 A1 Nov. 17, 2022

Related U.S. Application Data

(60) Provisional application No. 62/725,989, filed on Aug. 31, 2018.

(51) Int. Cl.
*G01N 30/86* (2006.01)
*G01N 30/72* (2006.01)
*H01J 49/00* (2006.01)

(52) U.S. Cl.
CPC ......... *G01N 30/8679* (2013.01); *G01N 30/72* (2013.01); *G01N 30/8631* (2013.01);
(Continued)

(58) Field of Classification Search
CPC . G01N 30/8679; G01N 30/72; G01N 30/8631
(Continued)

(56) References Cited

U.S. PATENT DOCUMENTS

2004/0113062 A1* 6/2004 Norton ............... G01N 30/8668
250/282
2006/0255258 A1 11/2006 Wang
(Continued)

FOREIGN PATENT DOCUMENTS

WO 2016075565 A1 5/2016
WO 2016125060 A1 8/2016

OTHER PUBLICATIONS

Jian Cui et al: "Joint Corresponding Feature Identification and Alignment for Multiple LC/MS Replicates," Genomic Signal Processing and Statistics, 2011 IEEE International Workshop ON, IEEE, Dec. 4, 2011, pp. 108-111, XP032136520.

(Continued)

*Primary Examiner* — Ricky Go
(74) *Attorney, Agent, or Firm* — Kasha Law LLC; John R. Kasha; Kelly L. Kasha

(57) ABSTRACT

A known compound and at least one adduct, modified form, or peptide of the known compound are separated from a sample mixture and analyzed. An XIC is calculated for each of M product ions of the known compound and L product ions of the at least one adduct, modified form, or peptide. A first XIC peak group is calculated from the M XICs and a second XIC peak group is calculated from the L XICs using curve subtraction. Representative first and second XIC peaks are selected for the two XIC peak groups. The (Continued)

retention time of the second XIC peak is shifted by an expected retention time difference found from a database. The retention time of the first XIC peak is verified as the retention time of the known compound if the difference of the retention times of the first and second XIC peaks is within a threshold.

15 Claims, 17 Drawing Sheets

(52) U.S. Cl.
CPC ...... *G01N 30/8644* (2013.01); *H01J 49/0031* (2013.01); *H01J 49/004* (2013.01)

(58) Field of Classification Search
USPC .......................................................... 702/30
See application file for complete search history.

(56) References Cited

U.S. PATENT DOCUMENTS

| | | |
|---|---|---|
| 2013/0131998 A1 | 5/2013 | Wright |
| 2014/0179020 A1 | 6/2014 | Wright |
| 2014/0332681 A1 | 11/2014 | Tate et al. |
| 2015/0162175 A1* | 6/2015 | Wright ............... G01N 30/8682 250/282 |
| 2016/0025691 A1* | 1/2016 | Taneda .................. G01N 30/72 702/23 |
| 2018/0350577 A1* | 12/2018 | Pfaff .................... H01J 49/0036 |
| 2019/0277817 A1* | 9/2019 | Yamaguchi ............ G01N 27/64 |
| 2019/0339238 A1* | 11/2019 | Yang ...................... G01N 30/74 |

OTHER PUBLICATIONS

International Search Report and Written Opinion for PCT/IB2019/056937, dated Dec. 27, 2019.

* cited by examiner

IDENTIFICATION AND SCORING OF RELATED COMPOUNDS IN COMPLEX SAMPLES

RELATED APPLICATIONS

This application claims the benefit of U.S. Provisional Patent Application Ser. No. 62/725,989, filed on Aug. 31, 2018, the content of which is incorporated by reference herein in its entirety.

INTRODUCTION

The teachings herein relate to including adducts, modified forms, or peptides of a compound in the identification or quantification of that compound. More particularly the teachings herein relate to systems and methods for identifying or verifying the retention time of a known compound using information about one or more adducts, modified forms, or peptides of the known compound. The systems and methods disclosed herein are performed using a mass spectrometer coupled to a separation device such as, but not limited to, a liquid chromatography (LC) device. The systems and methods disclosed herein are also performed in conjunction with a processor, controller, microcontroller, or computer system, such as the computer system of FIG. 1.

Retention Time Ambiguity

Mass spectrometers are often coupled with chromatography or other separation systems in order to identify and characterize eluting known compounds of interest from a sample. In such a coupled system, the eluting solvent is ionized and a series of mass spectra are obtained from the eluting solvent at specified time intervals. These time intervals range from, for example, 1 second to 100 minutes or greater. The series of mass spectra form a chromatogram, or extracted ion chromatogram (XIC).

Peaks found in the XIC are used to identify or characterize a known compound in the sample. In complex mixtures, however, interference with other peaks having the same mass-to-charge ratio (m/z) can make it difficult to determine a peak representing a known compound. In some cases, no information is available regarding the expected retention time of the known compound. In other cases, an approximate retention time of the known compound may be known. However, even in this latter case, the exact peak of the known compound can be ambiguous if the sample is complex or if there is more than a small amount of retention time variation between samples. As a result, it is often difficult to identify or characterize the known compound in these cases.

In traditional separation coupled mass spectrometry systems, a fragment or product ion of a known compound is selected for analysis. A mass spectrometry/mass spectrometry (MS/MS) scan is then performed at each interval of the separation for a mass range that includes the product ion. The intensity of the product ion found in each MS/MS scan is collected over time and analyzed as a collection of spectra, or an XIC, for example.

For a simple sample mixture, for example, a single peak representing the product ion is typically found in the XIC at the expected retention time of the known compound. For more complex mixtures, however, two or more peaks that represent the product ion are located at one or more additional time intervals in the collection of spectra in addition to the expected retention time of the known compound. In other words, an XIC for the product ion can have two or more peaks.

One traditional method of identifying compounds of interest in more complex mixtures has been to locate time intervals where two or more of the product ions of the known compound have peaks. This method is used in proteomics, for example, when a peptide of a known sequence is quantitated.

In a typical multiple reaction monitoring (MRM) method two or more MRM transitions are monitored, each corresponding to a different product ion transition of the peptide. If previous discovery data is available, these transitions are based on the largest product ions that are observed in the data. Otherwise these transitions are based on predicted y-ions, for example. The XIC is analyzed for these two or more MRM transitions. The time at which there is a product ion peak for all transitions is used to characterize the known compound.

For complex samples, especially if the expected retention time is not known accurately, there can be ambiguity in the collection of product ion spectra. For example, there can be more than one retention time or time interval for which there is a product ion peak for each of the two or more MRM transitions.

Little additional information is available to address the ambiguity introduced by complex samples. In traditional separation coupled mass spectrometry systems, each MS/MS scan for each product ion at each time interval is typically performed using a narrow precursor ion mass window width. As a result, the product ion mass spectrum at a particular time interval for each fragment ion that is available after data acquisition can provide little additional insight.

U.S. patent application Ser. No. 14/368,874 (hereinafter the "'874 Application"), now U.S. Pat. No. 9,343,276, entitled "Use of Windowed Mass Spectrometry Data for Retention Time Determination or Confirmation," describes of method of collecting additional MS/MS data and using this data to address the ambiguity introduced by complex samples. The '874 Application is incorporated herein by reference. In the '874 Application, a separation coupled mass spectrometry system is used that performs MS/MS scans at each time interval using one or more sequential mass window widths in order to span an entire mass range. In other words, spectral information for an entire mass range is obtained at each time interval in the separation. One method for performing MS/MS scans using one or more sequential mass window widths or precursor ion mass selection windows in order to span an entire mass is ABSciex's SWATH™ technique.

FIG. 2 is an exemplary diagram 200 of a precursor ion mass-to-charge ratio (m/z) range that is divided into ten precursor ion mass selection windows for a data independent acquisition (DIA) SWATH™ workflow. The m/z range shown in FIG. 2 is 200 m/z. Note that the terms "mass" and "m/z" are used interchangeably herein. Generally, mass spectrometry measurements are made in m/z and converted to mass by multiplying by charge.

Each of the ten precursor ion mass selection or isolation windows spans or has a width of 20 m/z. Three of the ten precursor ion mass selection windows, windows 201, 202, and 210, are shown in FIG. 2. Precursor ion mass selection windows 201, 202, and 210 are shown as non-overlapping windows with the same width. Precursor ion mass selection windows can also overlap and/or can have variable widths. U.S. patent application Ser. No. 14/401,032 describes using overlapping precursor ion mass selection windows in a single cycle of SWATH™ acquisition, for example. U.S. Pat. No. 8,809,772 describes using precursor ion mass selection windows with variable widths in a single cycle of SWATH™ acquisition using variable precursor ion mass selection windows in SWATH™ acquisition, for example. In a conventional SWATH™ acquisition, each of the ten precursor ion mass selection windows is selected and then fragmented, producing ten product ion spectra for the entire m/z range shown in FIG. 2.

FIG. 2 depicts non-variable and non-overlapping precursor ion mass selection windows used in a single cycle of an exemplary SWATH™ acquisition. A tandem mass spectrometer that can perform a SWATH™ acquisition method can further be coupled with a sample introduction device that separates one or more compounds from the sample over time, for example. A sample introduction device can introduce a sample to the tandem mass spectrometer using a technique that includes, but is not limited to, injection, liquid chromatography, gas chromatography, capillary electrophoresis, or ion mobility. The separated one or more compounds are ionized by an ion source, producing an ion beam of precursor ions of the one or more compounds that are selected and fragmented by the tandem mass spectrometer.

As a result, for each time step of a sample introduction of separated compounds, each of the ten precursor ion mass selection windows is selected and then fragmented, producing ten product ion spectra for the entire m/z range. In other words, each of the ten precursor ion mass selection windows is selected and then fragmented during each cycle of a plurality of cycles.

FIG. 3 is an exemplary diagram 300 that graphically depicts the steps for obtaining product ion traces or extracted ion chromatograms (XICs) from each precursor ion mass selection window during each cycle of a DIA workflow. For example, ten precursor ion mass selection windows, represented by precursor ion mass selection windows 201, 202, and 210 in FIG. 3, are selected and fragmented during each cycle of a total of 1000 cycles.

During each cycle a product ion spectrum is obtained for each precursor ion mass selection window. For example, product ion spectrum 311 is obtained by fragmenting precursor ion mass selection window 201 during cycle 1, product ion spectrum 312 is obtained by fragmenting precursor ion mass selection window 201 during cycle 2, and product ion spectrum 313 is obtained by fragmenting precursor ion mass selection window 201 during cycle 1000.

By plotting the intensities of the product ions in each product ion spectrum of each precursor ion mass selection window over time, XICs can be calculated for each product ion produced from each precursor ion mass selection window. For example, plot 320 includes the XICs calculated for each product ion of the 1000 product ion spectra of precursor ion mass selection window 201. Note that XICs can be plotted in terms of time or cycles.

The XICs in plot 320 are shown plotted in two dimensions in FIG. 3. However, each XIC is actually three-dimensional, because the different XICs are calculated for different m/z values.

FIG. 4 is an exemplary diagram 400 that shows the three-dimensionality of product ion XICs obtained for a precursor ion mass selection window over time. In FIG. 4, the x axis is time or cycle number, the y axis is product ion intensity, and the z axis is m/z. From this three-dimensional plot, more information is obtained. For example, XIC peaks 410 and 420 both have the same shape and occur at the same time, or same retention time. However, XIC peaks 410 and 420 have different m/z values. This may mean that XIC peaks 410 and 420 are isotopic peaks or represent different product ions from the same precursor ion. Similarly, XIC peaks 430 and 440 have the same m/z value, but occur at different times. This may mean that XIC peaks 430 and 440 are the same product ion, but they are from two different precursor ions.

In the '874 Application, the spectral information for an entire mass range collected using SWATH™ is used to resolve the retention time ambiguity in complex mixtures. In other words, when a product ion is found to have two or more peaks in the collection of spectra at two or more different time intervals in the separation, the product ion mass spectrum at each of the different time intervals is analyzed to determine the actual retention time. A variety of criteria are used to analyze the mass spectra of the entire mass range, including charge state, isotopic state, mass accuracy, and one or more mass differences associated with a known fragmentation profile of the known compound. Based on these criteria each peak of the product ion at the two or more time intervals is scored. A retention time for the known compound is identified at the peak with the highest score.

FIG. 5 is an exemplary diagram 500 that shows how the method of the '874 Application can resolve the retention time ambiguity in complex mixtures. In this method, for example, an extracted ion chromatogram (XIC) is calculated for a product ion with m/z of 431 from a collection of SWATH™ product ion spectra. This XIC is depicted along the dashed line 510. The XIC has two XIC peaks, XIC Peak 511 and XIC Peak 512. These two peaks are at retention times T1 and T2, respectively, providing a retention time ambiguity.

As a result, the method of the '874 Application obtains the mass spectrum containing the m/z peak at the apex of each XIC peak in order to resolve the ambiguity. For example, mass spectrum 521 is obtained for XIC Peak 511, because mass spectrum 521 contains m/z Peak 531, which is the m/z peak at the apex of XIC Peak 511. Mass spectrum 522 is obtained for XIC Peak 512, because mass spectrum 522 contains m/z Peak 532, which is the m/z peak at the apex of XIC Peak 512.

The method of the '874 Application further compares the values of one or more ion characteristics of the m/z peaks of the mass spectra obtained to known values for the product ion. For example, the one or more ion characteristics can be the mass accuracy of the m/z peak. The masses of m/z Peak 531 and m/z Peak 532 are then compared to a known accurate mass value for the product ion with m/z 431.

Suppose, for example, that the known mass accuracy of the product ion with m/z 431 is 431.0345, the mass of m/z Peak 531 is 431.0344, and the mass of m/z Peak 532 is 431.128. Then, m/z Peak 531 has a mass accuracy closer to the known accurate mass of the product ion with m/z 431 than m/z Peak 532. As a result, it is more likely that the retention time of XIC Peak 511 is the retention time of the known compound than the retention time of XIC Peak 512. This probability can be reflected by scoring XIC Peak 511 higher than XIC Peak 512, for example.

The method of the '874 Application can also use more than one product ion of the known compound to resolve the retention time ambiguity. Peaks of each of the two or more product ions are independently scored at the two or more time intervals and the scores of the peaks of the two or more product ions are combined at each of the two or more time intervals. The retention time is then determined from the combined scores at each of the two or more time intervals. In other words, the method of the '874 Application groups the peaks of two or more different product ions of the known compound at each time interval and compares the combined score of the group at each time interval.

The method of the '874 Application does not describe, however, how the XIC peaks of the two or more different product ions of the known compound are selected. As described above with regard to MRM transitions, if previous discovery data is available, the MRM transitions selected are based on the largest product ions that are observed in the data. In other words, the MRM transitions with the most intense product ion peaks are selected.

Suppose, for example, the method of the '874 Application similarly groups peaks by first selecting the most intense peak of a first product ion and then selecting peaks of other product ions closest in time to the apex of the most intense peak of a first product ion. Now suppose the most intense peak of a first product ion is from a precursor ion that is not the known compound. The peaks of other product ions are then grouped and scored with the wrong peak. Consequently, the results of the method of the '874 Application are highly dependent on proper selection of peaks for the group of peaks.

Peak Group Selection

International Application No. PCT/IB2016/050481 (hereinafter the "'481 Application"), entitled "Detecting Mass Spectrometry Based Similarity Via Curve Subtraction," describes a method of grouping XIC peaks of two or more product ions of a known compound. The '481 Application is incorporated herein by reference. In the '481 Application, the proper selection of peaks for the group of peaks is accomplished using curve subtraction.

FIG. 6 is an exemplary of plot 600 of five XICs for five product ions of a known compound. The five XICs of plot 600 are calculated from data collected by performing MS/MS scans at each time interval of a separation using one or more SWATH™ mass window widths in order to span the entire mass range. The five XICs of plot 600 all appear to have regions of similarity around a retention time of 56.

Regions of similarly are found by locally comparing or subtracting groups of intensities at adjacent retention times in pairs of XICs. For example, the intensities of XIC 620 are not simply subtracted from the intensities of XIC 610 at the same retention times. Instead, at each retention time, the intensity of XIC 610 and the intensities of XIC 610 at two or more adjacent retention times are divided by the intensity of XIC 610 at the retention time, effectively normalizing a first group of intensities of XIC 610. At the same retention time, the intensity of XIC 620 and the intensities of XIC 620 at the two or more adjacent retention times are divided by the intensity of XIC 620 at the retention time, effectively normalizing a second group of intensities of XIC 620. Each intensity of the second group is then subtracted from the corresponding intensity of the first group, producing a set of difference values. A single value is obtained for each retention time by calculating a statistical measure of the set of difference values. A statistical measure can be, but is not limited to, the mean, mode, median, variance, or standard deviation of the set of difference values.

FIG. 7 is an exemplary of plot 700 of a detailed portion of the five XICs shown in FIG. 6 between retention times 50 and 65. Plot 700 shows, for example, how regions of similarly are found by locally comparing or subtracting groups of nine intensities, N=9, at adjacent retention times in pairs of XICs. In plot 700, the nine intensities of XIC 610 that are normalized at retention time 57 are shown as $a_{53}$, $a_{54}$, $a_{55}$, $a_{56}$, $a_{57}$, $a_{58}$, $a_{59}$, $a_{60}$, and $a_{61}$. Each of these nine values is normalized, for example, by dividing by $a_{57}$. The corresponding nine intensities of XIC 620 that are normalized at retention time 57 are, for example, $b_{53}$, $b_{54}$, $b_{55}$, $b_{56}$, $b_{57}$, $b_{58}$, $b_{59}$, $b_{60}$, and $b_{61}$ (not shown). Similarly, each of these nine values is normalized, for example, by dividing by $b_{57}$. After normalization, these nine intensities of XIC 620 are subtracted from the corresponding nine intensities of XIC 610 producing a set of difference values. A single value is obtained for retention time 57 by calculating a statistical measure of the set of difference values. The statistical measures calculated for each retention time of the XICs compared can be plotted as a comparison or subtraction curve.

FIG. 8 is an exemplary plot 800 of a subtraction curve that shows the mean values calculated from the local subtraction of intensities of two XICs of the XICs shown in FIG. 6. Each mean value, p, shown in plot 800 is calculated, for example, according Equation (1).

$$\mu_{i+m} = \frac{1}{N}\sum_{j=1}^{N}\left(\left(\frac{a_{i+j}}{a_{i+m}}\right)^{\frac{1}{2}} - \left(\frac{b_{i+j}}{b_{i+m}}\right)^{\frac{1}{2}}\right) \quad (1)$$

At each retention time, i+m, each intensity value, b, of N adjacent of intensity values of a second XIC is normalized and subtracted from each corresponding normalized value, a, of N adjacent of intensity values of a first XIC. N is an odd number and m is the midpoint of N.

Returning to FIG. 7, plot 700 shows, for example, using nine, N=9, intensities to calculate a mean at each retention time. In plot 700, the nine intensities of XIC 610 used in calculating a mean at retention time 57 are shown. These nine intensities are $a_{53}$, $a_{54}$, $a_{55}$, $a_{56}$, $a_{57}$, $a_{58}$, $a_{59}$, $a_{60}$, and $a_{61}$. The corresponding nine intensities of XIC 620 that are used in calculating a mean at retention time 57 are, for example, $b_{53}$, $b_{54}$, $b_{55}$, $b_{56}$, $b_{57}$, $b_{58}$, $b_{59}$, $b_{60}$, and $b_{61}$ (not shown).

When XIC 620 is subtracted from XIC 610, the mean at retention time 57, $\mu_{57}$, is calculated by subtracting the nine points of XIC 620, $b_{53}$, $b_{54}$, $b_{55}$, $b_{56}$, $b_{57}$, $b_{58}$, $b_{59}$, $b_{60}$, and $b_{61}$ (not shown), from the nine points of XIC 610 according to Equation (1). For example, the mean at retention time 57, $\mu_{57}$, is calculated according to $$\mu_{57} = \frac{1}{9}\sum_{j=1}^{9}\left(\left(\frac{a_{52+j}}{a_{57}}\right)^{\frac{1}{2}} - \left(\frac{b_{52+j}}{b_{57}}\right)^{\frac{1}{2}}\right),$$

where the midpoint, m, of nine points is 5.

Returning to FIG. 8, the subtraction curve showing mean values can be used to identify regions where two XICs are similar. In regions where the two XICs are similar, the mean should be close to zero. Plot 800 shows a retention time region 810 near retention time 56 where the mean values are close to zero. As a result, plot 800 suggests that peaks of the two XICs can be grouped in retention time region 810. In plot 800, however, the mean values frequently cross through a value of zero making it somewhat difficult to distinguish similar regions.

Similar regions of XICs can further be distinguished by calculating a subtraction curve showing standard deviation values. Like the mean, p, the standard deviation, v, at each retention time is calculated from an odd number, N, of XIC values, a and b, in regions of each of the two XICs spanning the retention time. Mathematically, for a retention time, i+m, with a number of points, N, and having m as the midpoint of N points, the standard deviation is given by Equation (2).

$$\sigma_{i+m} = \sqrt{\sum_{j=1}^{N}\left(\left(\frac{a_{i+j}}{a_{i+m}}\right)^{\frac{1}{2}} - \left(\frac{b_{i+j}}{b_{i+m}}\right)^{\frac{1}{2}} - \mu_{i+m}\right)^{2}} \quad (2)$$

Returning to FIG. 7, for example, when XIC 620 is subtracted from XIC 610, the square root of the variance at retention time 57, $\sigma_{57}$, is calculated by subtracting the nine points of XIC 620, $b_{53}$, $b_{54}$, $b_{55}$, $b_{56}$, $b_{57}$, $b_{58}$, $b_{59}$, $b_{60}$, and $b_{61}$ (not shown), from the nine points of XIC 610 according to Equation (2). For example, the square root of the variance retention time 57, $\sigma_{57}$, is calculated according to $$\sigma_{57} = \sqrt{\sum_{j=1}^{9}\frac{1}{9}\left(\left(\frac{a_{52+j}}{a_{57}}\right)^{\frac{1}{2}} - \left(\frac{b_{52+j}}{b_{57}}\right)^{\frac{1}{2}} - \mu_{57}\right)},$$

where the midpoint, m, of nine points is 5.

FIG. 9 is an exemplary plot 900 of a subtraction curve that shows the standard deviation values calculated from the local subtraction of intensities of two XICs of the XICs shown in FIG. 6. Plot 900 shows a retention time region 910 near retention time 56 where the values for the square root of the variance are close to zero. As a result, plot 900 suggests that peaks of the two XICs can be grouped in retention time region 910. A comparison of the FIG. 9 with FIG. 8 shows that similar regions of two XICs are more easily distinguished from the values for the square root of the variance than from mean values.

In various embodiments, for each set of M product ions of the known compound, $$\binom{M}{2} = \frac{M!}{2!(M-2)!}$$

subtractions of XICs are performed producing $$\binom{M}{2}$$

subtraction curves. The peaks of the M XICs are then grouped according to the $$\binom{M}{2}$$

subtraction curves. Retention times of one or more of the $$\binom{M}{2}$$

subtraction curves are identified that have values that are within a threshold value of zero. In other words, the subtraction curves are examined for locations where the statistical comparison measure approaches zero. For one or more retention times where the statistical comparison measure approaches zero, the two or more XICs used to calculate the one or more subtraction curves are obtained. A peak group is created from the peaks of the two or more XICs within the one or more retention times.

FIG. 10 is an exemplary plot 1000 of the $$\binom{5}{2}$$

subtraction curves showing standard deviation values calculated from the five XICs of FIG. 6. Plot 1000 shows that in retention time region 1010 near retention time 56 the $$\binom{5}{2}$$

subtraction curves have a value close to zero. This implies all five XICs have a similar peak shape in retention time region 1010.

FIG. 11 is an exemplary plot 1100 of a detailed portion of the $$\binom{5}{2}$$

subtraction curves showing standard deviation values shown in FIG. 6 between retention times 50 and 65. Plot 1100 show more clearly that the $$\binom{5}{2}$$

subtraction curves all have a value less than 0.1 in retention time region 1110 between retention times 55 and 57. As a result, the peaks of all five XICs in retention time region 1110 can be grouped. The peaks of the group can then be scored using criteria similar to the criteria used in the '874 Application. The group with the highest score is then used to identify and/or quantify the known compound.

The methods of the '874 Application and the '481 Application greatly improve the identification and quantification of known compounds in complex samples. However, these and other methods are directed to measuring a single known compound. Unfortunately, it is known that compounds may exist in many forms which are artifacts created during the processing. The problem is that these compounds reduce the limit of detection of the different targets compounds and also provide interferences limiting the ability to see what is really changing in the sample.

As a result systems and methods are needed that can take into account the presence of adducts, modified forms, or peptides of a compound being identified or quantified in a complex sample.

SUMMARY

A system, method, and computer program product are disclosed for verifying the retention time of a known compound using an adduct, modified form, or peptide of the known compound. All three embodiments include the following steps.

A separation device separates a known compound and at least one adduct, modified form, or peptide of the known compound from a sample mixture. A mass spectrometer performs at each retention time of a plurality of retention times one or more mass spectrometry/mass spectrometry (MS/MS) scans on the separating sample mixture using one or more sequential mass window widths in order to span an entire mass range, producing a collection of product ion spectra for the entire mass range for the plurality of retention times. A database includes expected retention times and expected product ion mass spectra for the product ions of the known compound and the at least one adduct, modified form, or peptide of the known compound.

A processor receives the collection of product ion spectra for the entire mass range for the plurality of retention times from the mass spectrometer. The processor selects M product ions of the known compound using the database. The processor calculates an XIC for each of the M product ions from the collection of product ion spectra, producing M XICs. The processor calculates a first XIC peak group that represents the known compound from the M XICs using curve subtraction. The processor selects a first XIC peak of the first XIC peak group that represents the known compound.

The processor selects L product ions of the at least one adduct, modified form, or peptide of the known compound using database. The processor calculates an XIC for each of the L product ions from the collection of product ion spectra, producing L XICs. The processor calculates a second XIC peak group that represents the at least one adduct, modified form, or peptide of the known compound from the L XICs using curve subtraction. The processor selects a second XIC peak of the second XIC peak group that represents the at least one adduct, modified form, or peptide of the known compound.

The processor shifts the retention time of the second XIC peak by the difference between the expected retention time of the first XIC peak found from database and the expected retention time of the second XIC peak found from database. The processor verifies that the retention time of the first XIC peak is the retention time of the known compound if the shifted retention time of the second XIC peak is within a retention time threshold of the retention time of the first XIC peak. The retention time threshold can be predetermined or received from a user, for example.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 6:
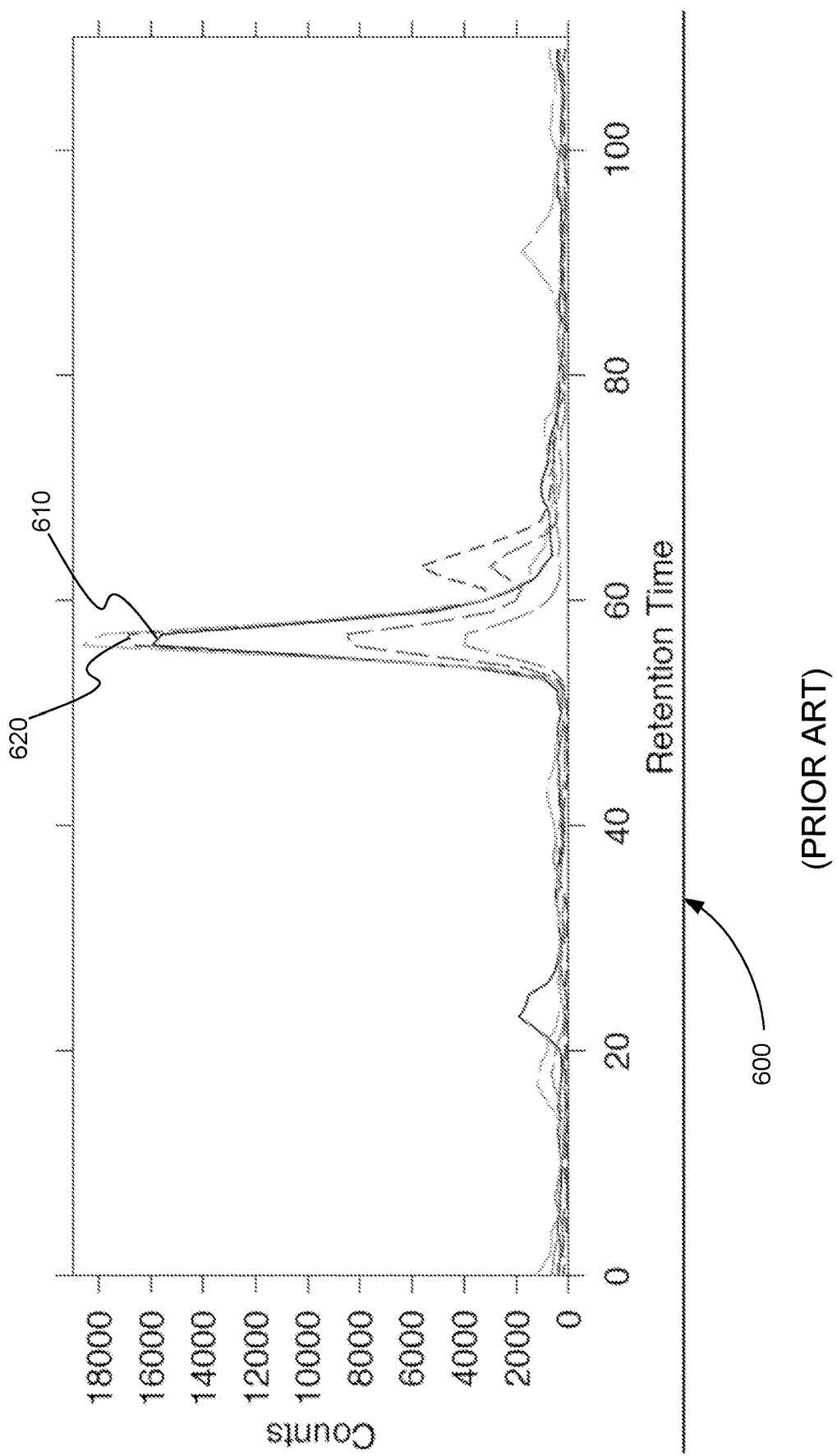
FIG. 6 is an exemplary of plot of five XICs for five product ions of a known compound.
Figure 7:
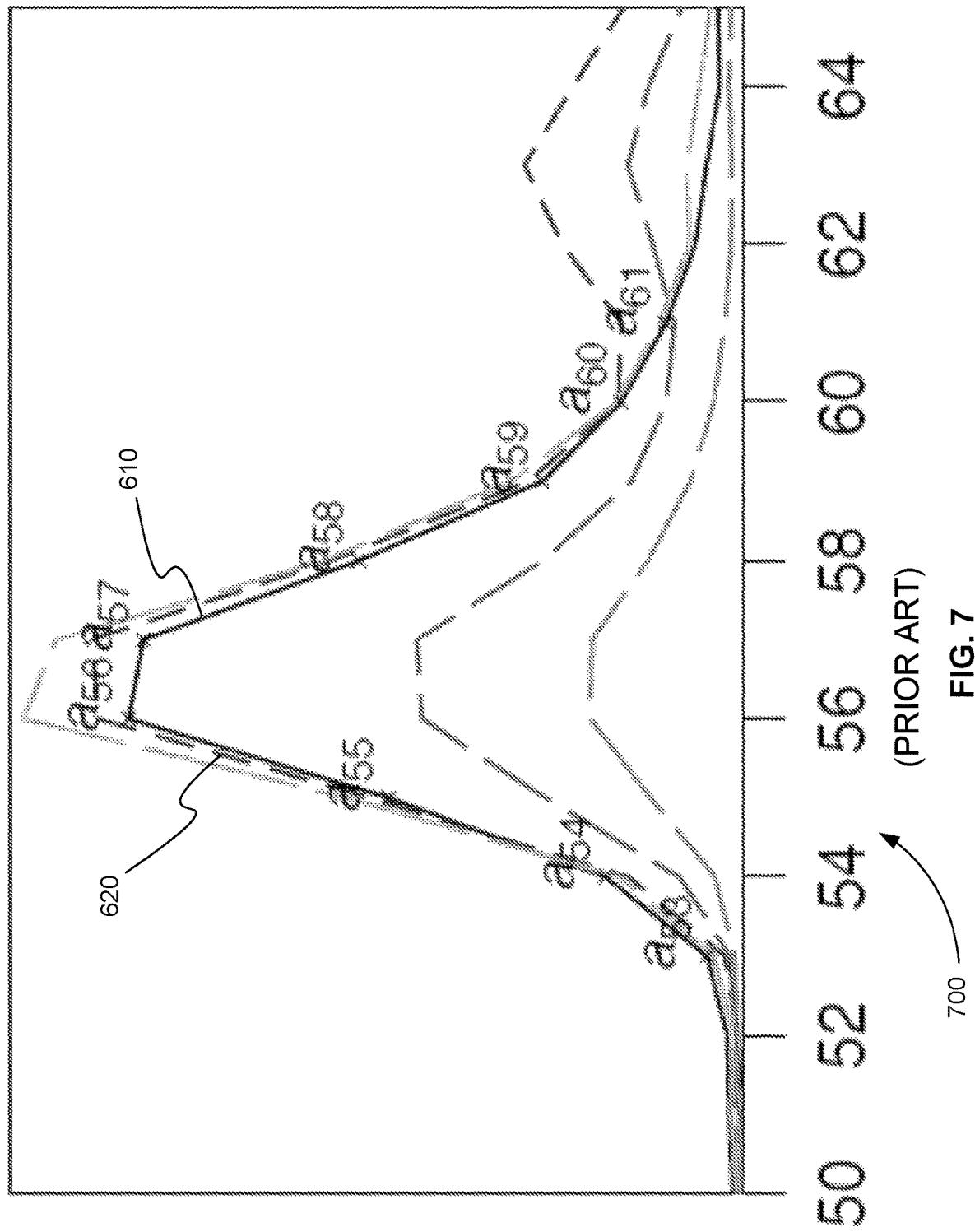
FIG. 7 is an exemplary of plot of a detailed portion of the five XICs shown in FIG. 6 between retention times 50 and 65.
Figure 8:
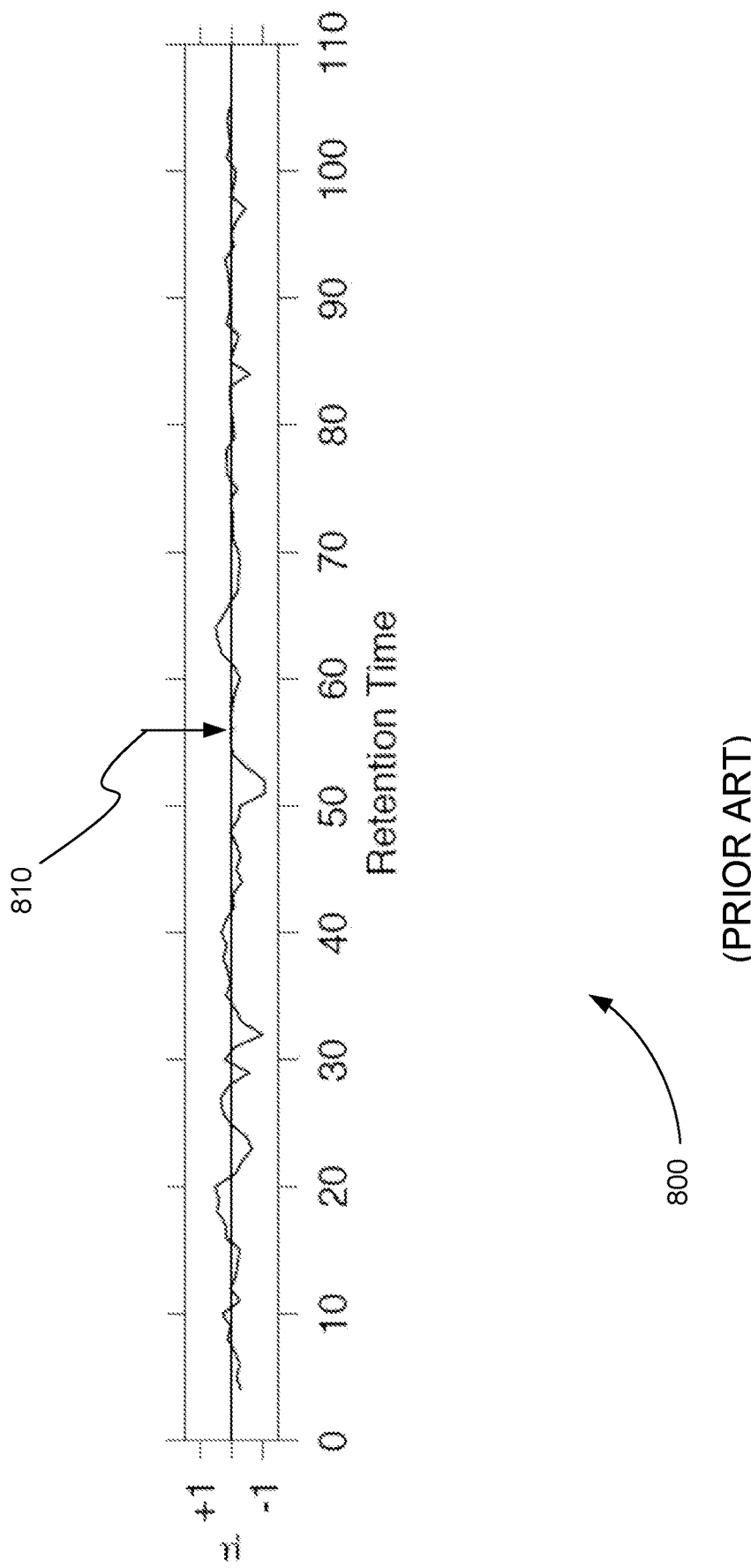
FIG. 8 is an exemplary plot of a subtraction curve that shows the mean values calculated from the local subtraction of intensities of two XICs of the XICs shown in FIG. 6.
Figure 9:
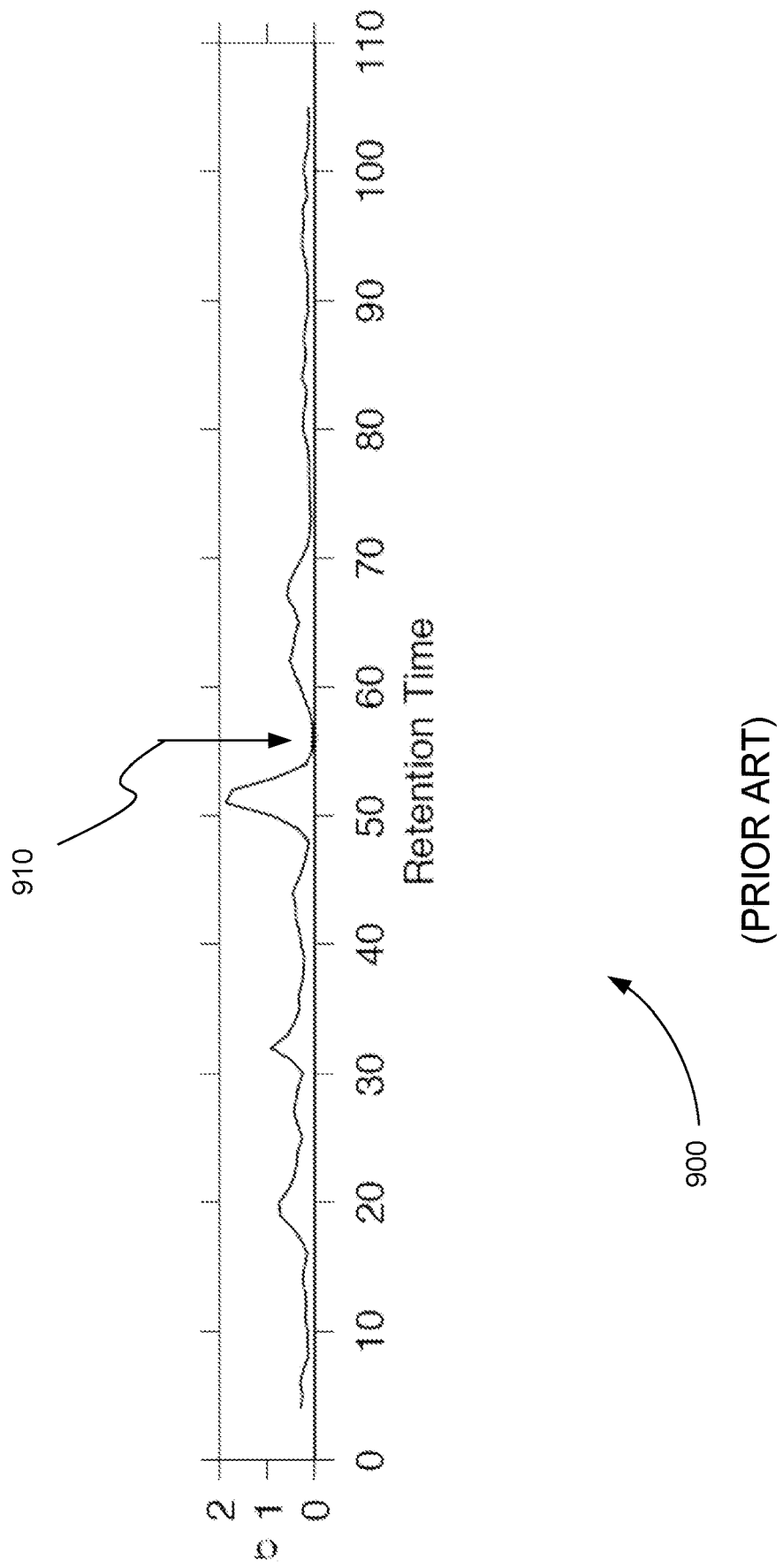
FIG. 9 is an exemplary plot of a subtraction curve that shows the standard deviation values calculated from the local subtraction of intensities of two XICs of the XICs shown in FIG. 6.
Figure 10:
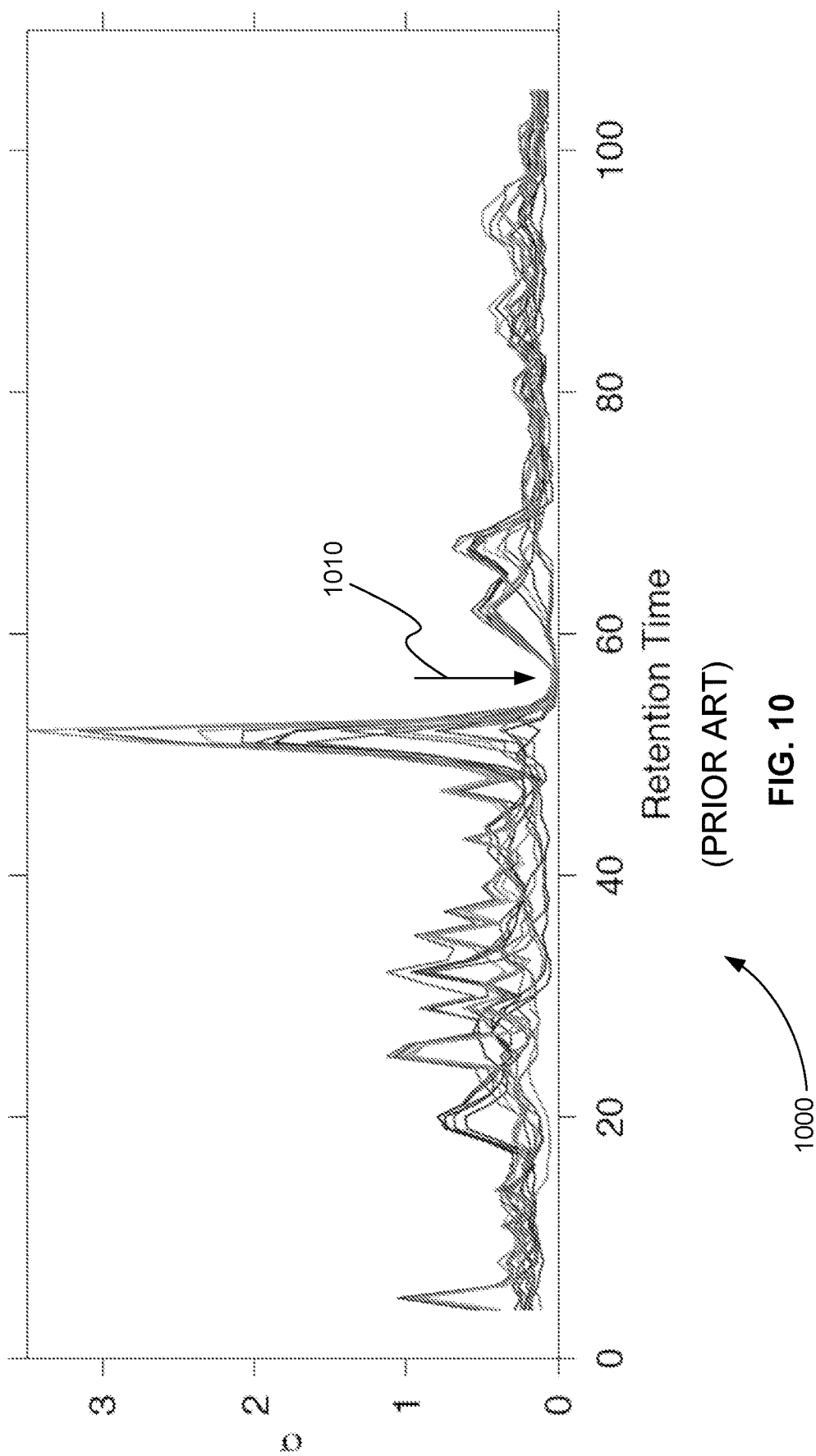
FIG. 10 is an exemplary plot of the $$\binom{5}{2}$$

subtraction curves showing standard deviation values calculated from the five XICs of FIG. 6.

Figure 11:
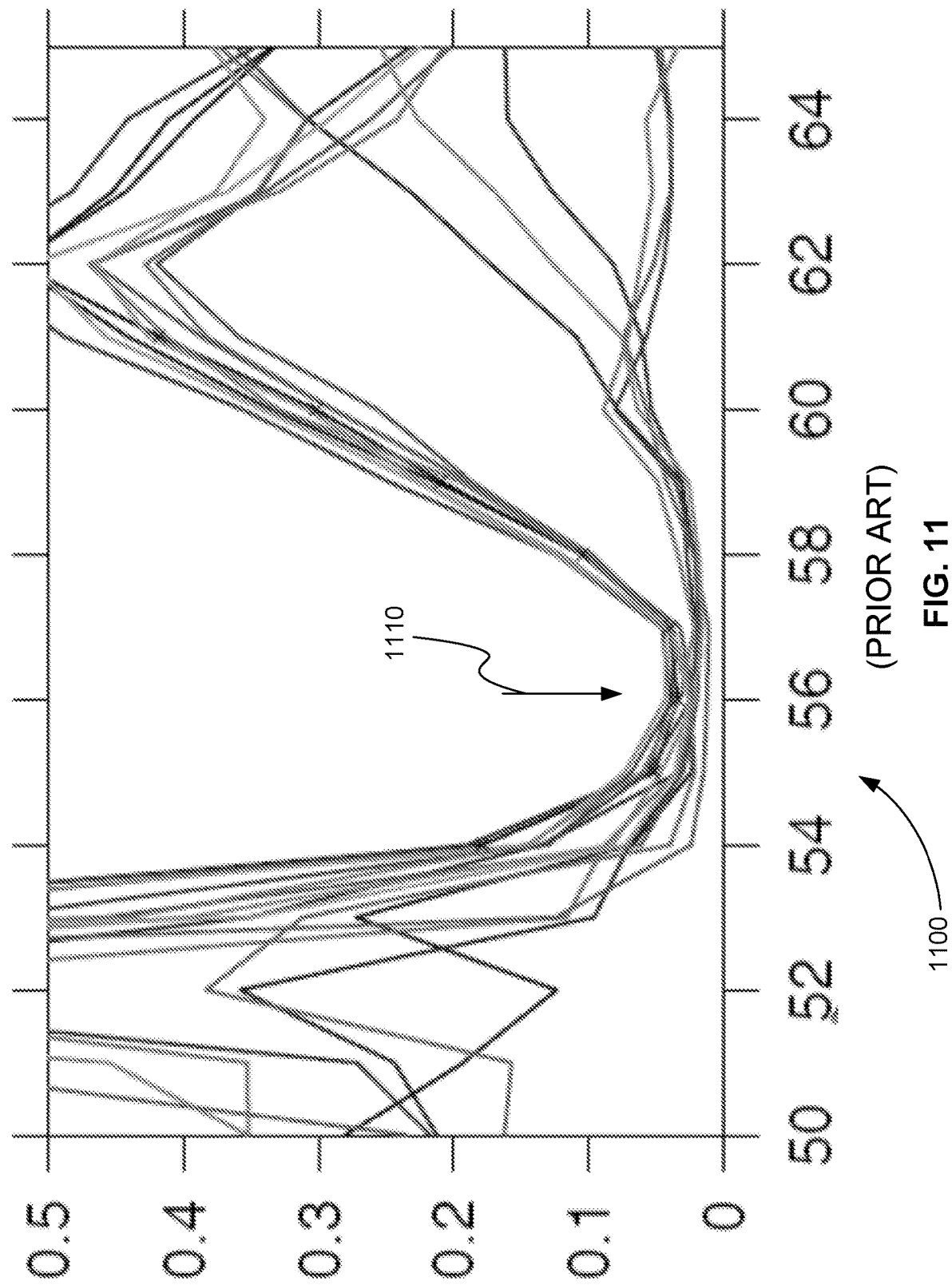

FIG. 11 is an exemplary plot of a detailed portion of the $$\binom{5}{2}$$

subtraction curves showing standard deviation values shown in FIG. 6 between retention times 50 and 65.

Figure 12:
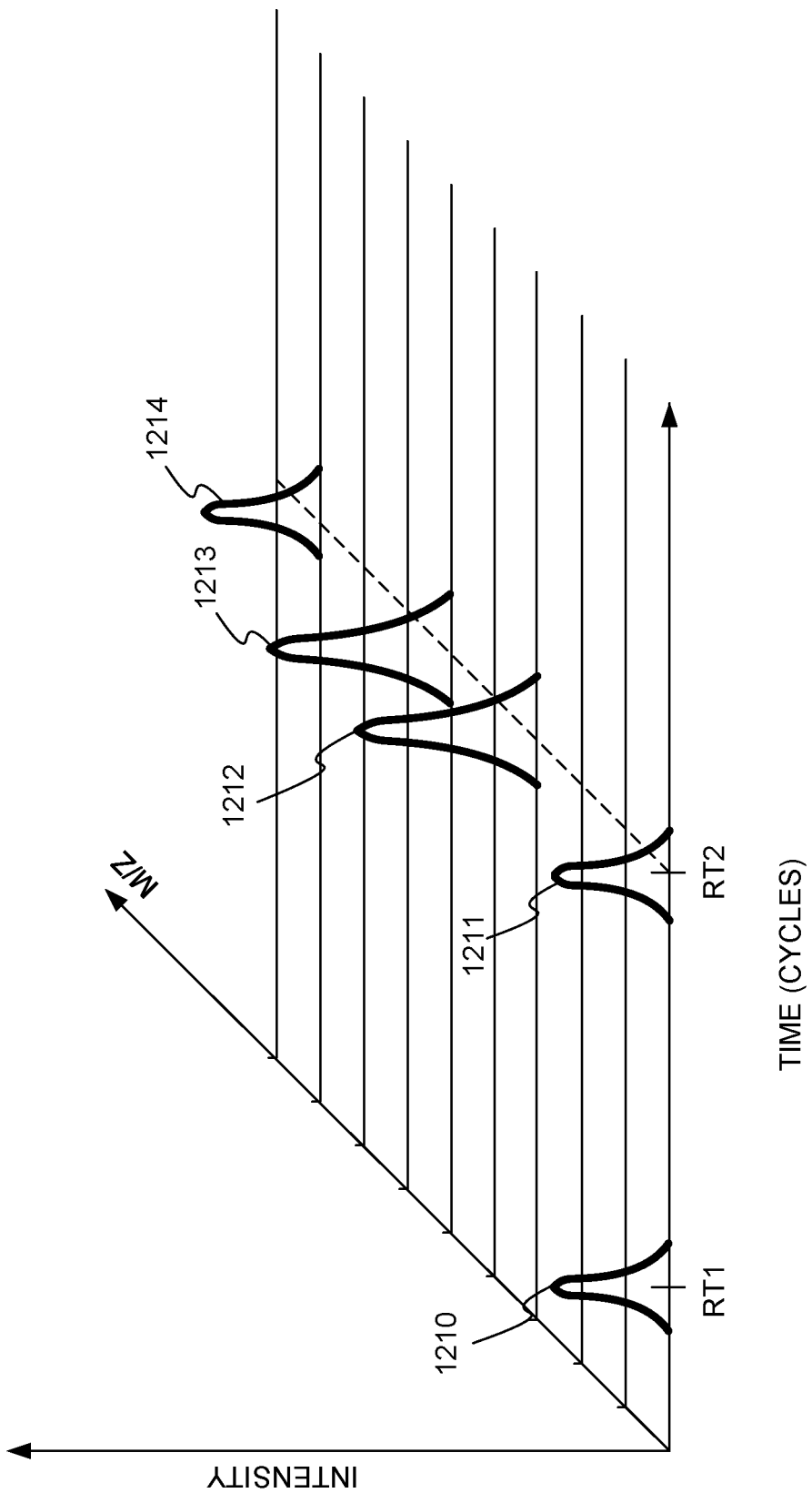

FIG. 12 is an exemplary plot of the product ion XIC peaks found for form $A^{2+}$ of the known compound A from a complex sample, in accordance with various embodiments.

Figure 13:
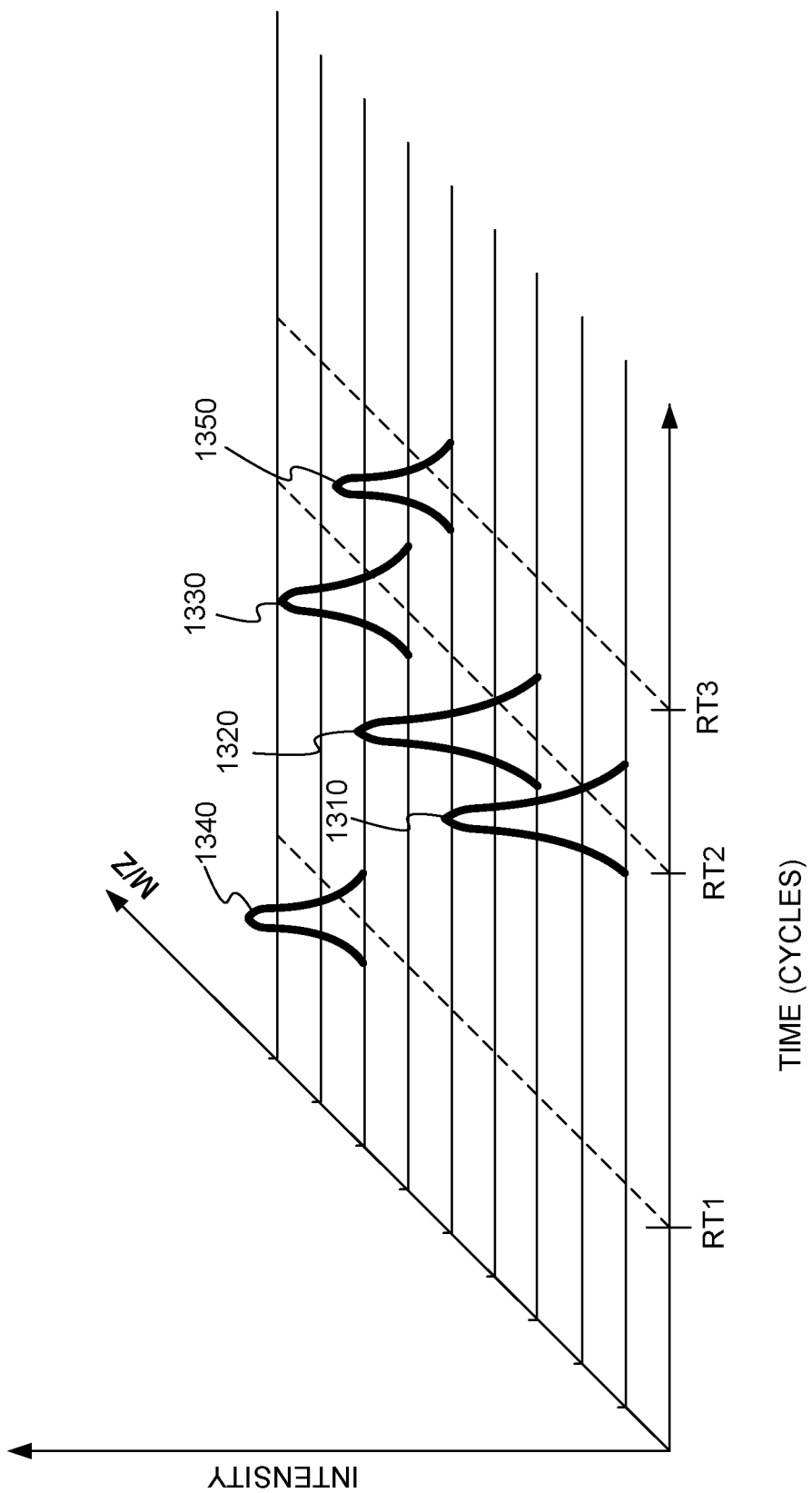

FIG. 13 is an exemplary plot of the product ion XIC score curves found for each of the five forms of the known compound A found in a complex sample, in accordance with various embodiments.

Figure 14:
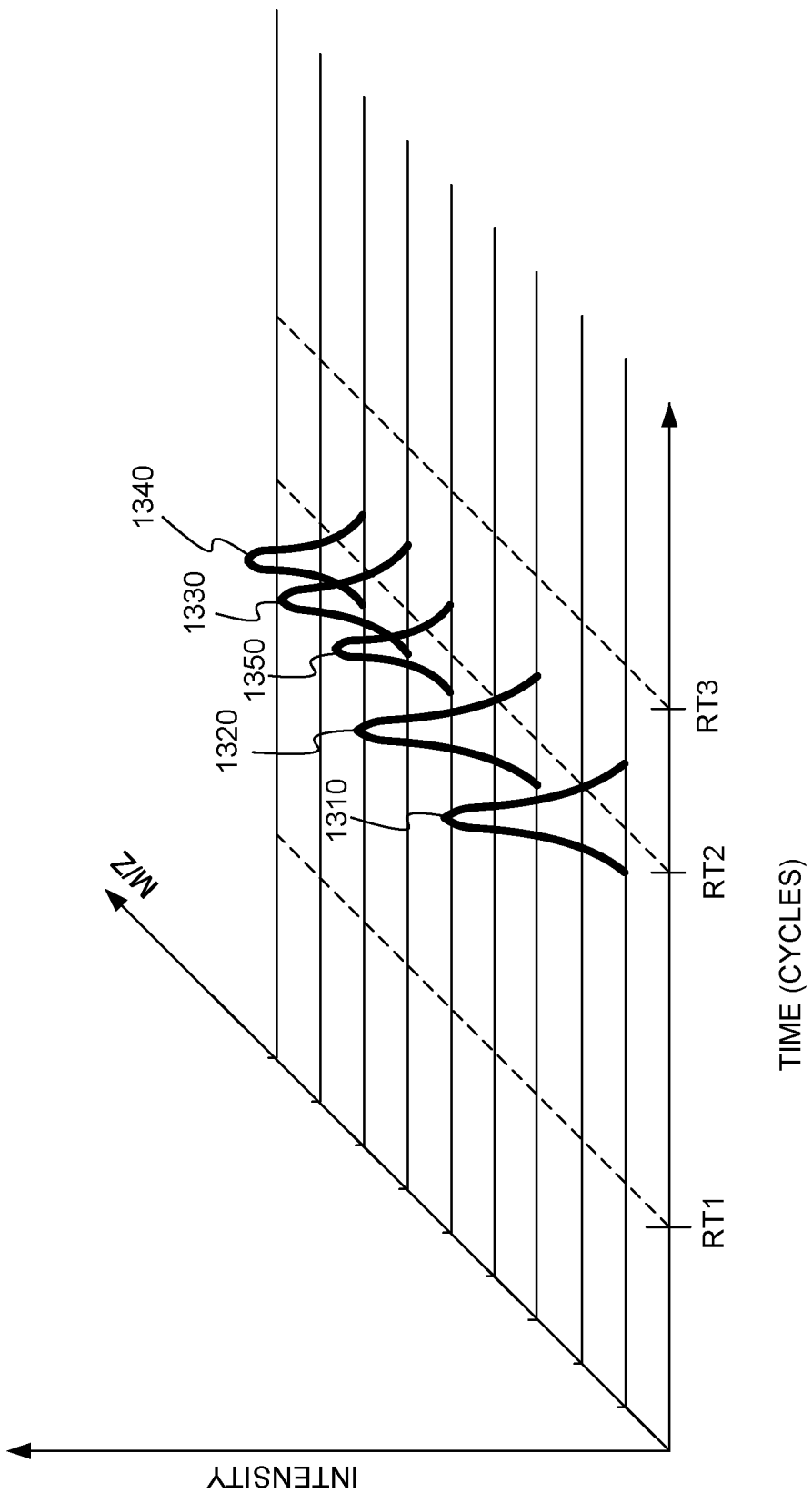

FIG. 14 is an exemplary plot of the product ion score curves found for each of the five forms of the known compound A shifted by the expected retention time offsets to align the score curves with the expected retention time of the canonical form A of the compound, in accordance with various embodiments.

Figure 15:
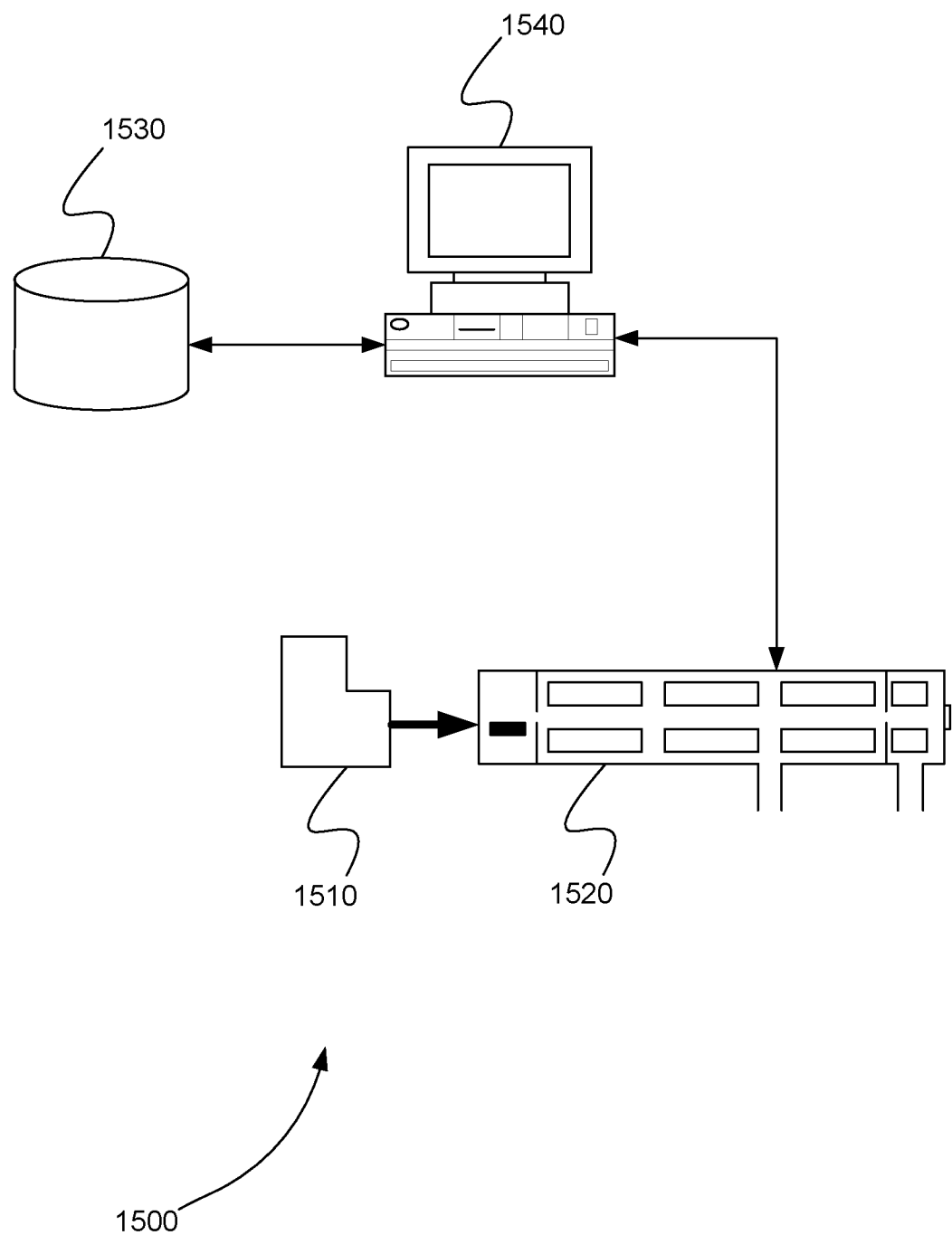

FIG. 15 is a schematic diagram of a system for verifying the retention time of a known compound using an adduct, modified form, or peptide of the known compound, in accordance with various embodiments.

Figure 16:
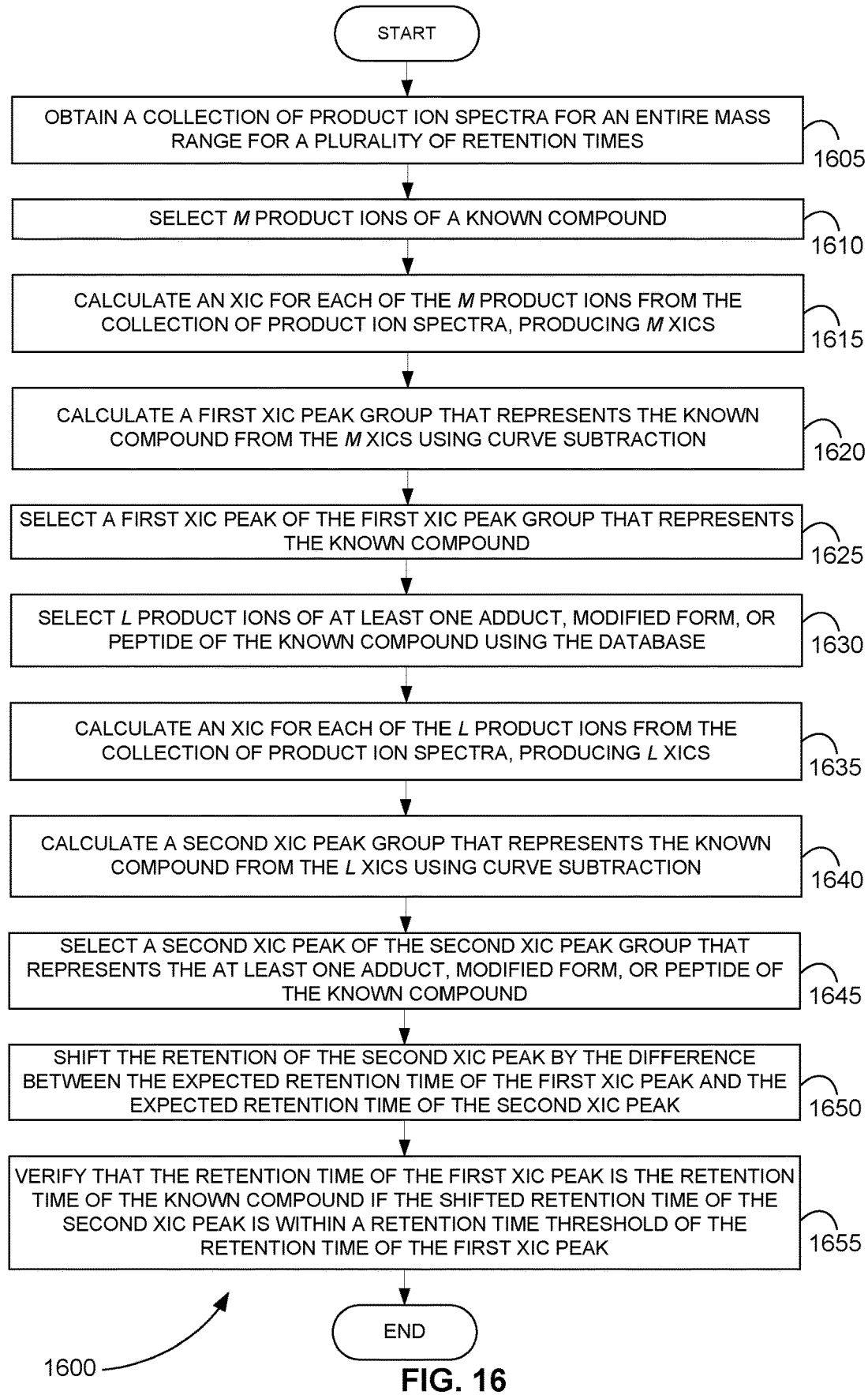

FIG. 16 is a flowchart showing a method for verifying the retention time of a known compound using an adduct, modified form, or peptide of the known compound, in accordance with various embodiments.

Figure 17:
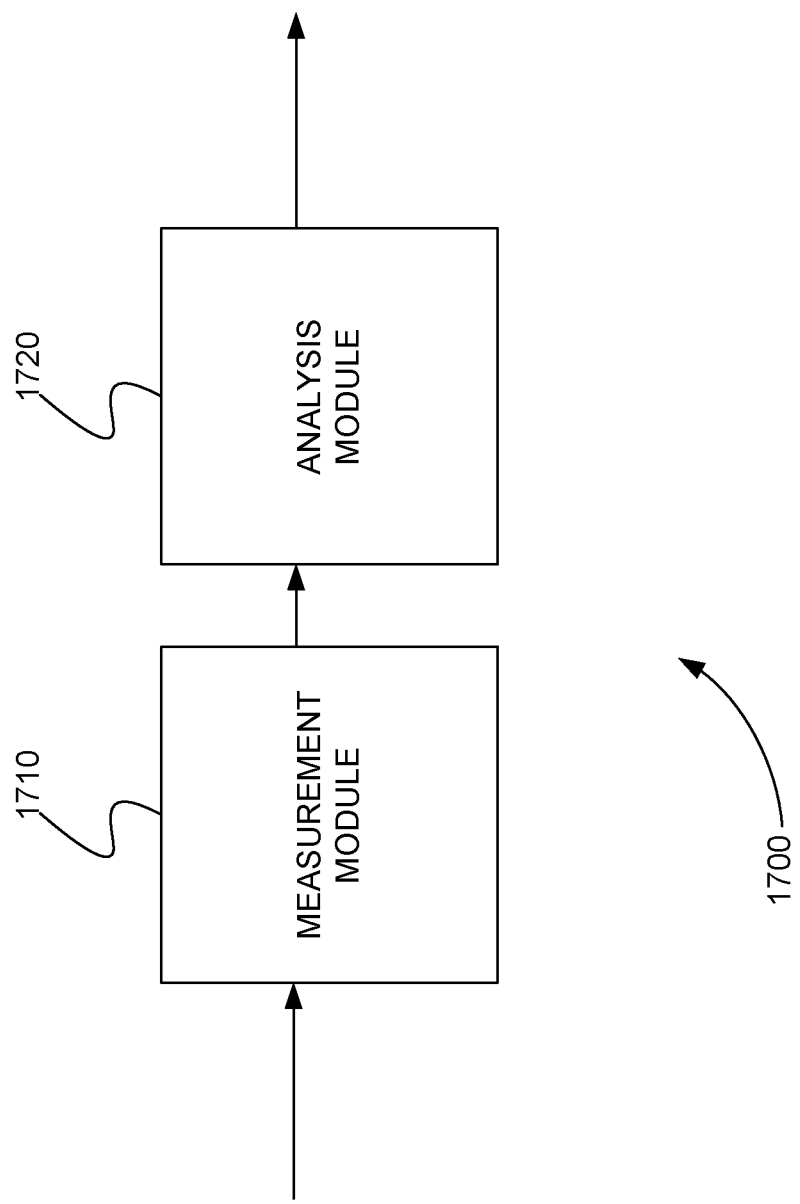

FIG. 17 is a schematic diagram of a system that includes one or more distinct software modules that performs a method for verifying the retention time of a known compound using an adduct, modified form, or peptide of the known compound, in accordance with various embodiments.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

Figure 1:
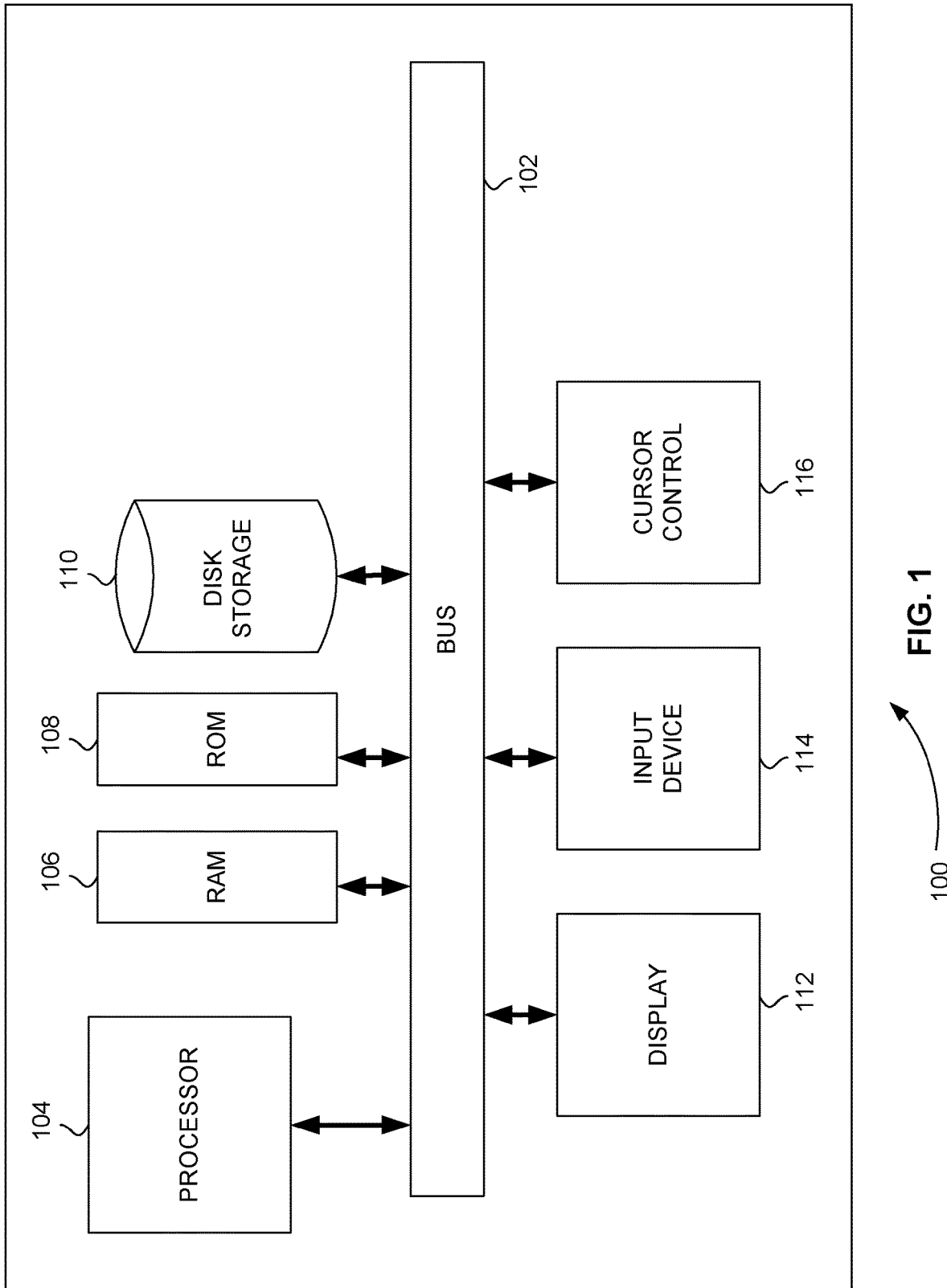
FIG. 1 is a block diagram that illustrates a computer system, upon which embodiments of the present teachings may be implemented.
Figure 2:
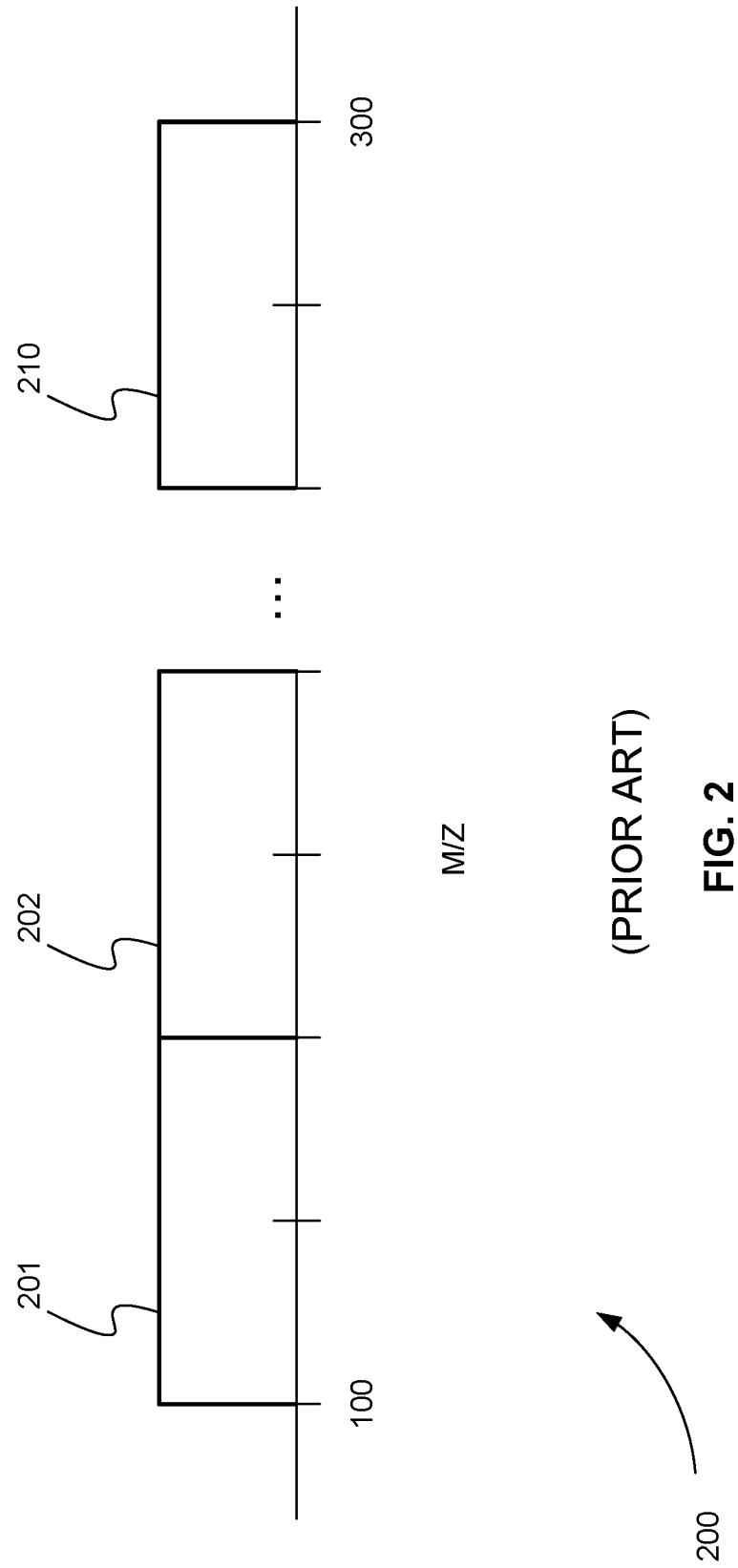
FIG. 2 is an exemplary diagram of a precursor ion mass-to-charge ratio (m/z) range that is divided into ten precursor ion mass selection windows for a data independent acquisition (DIA) SWATH™ workflow.
Figure 3:
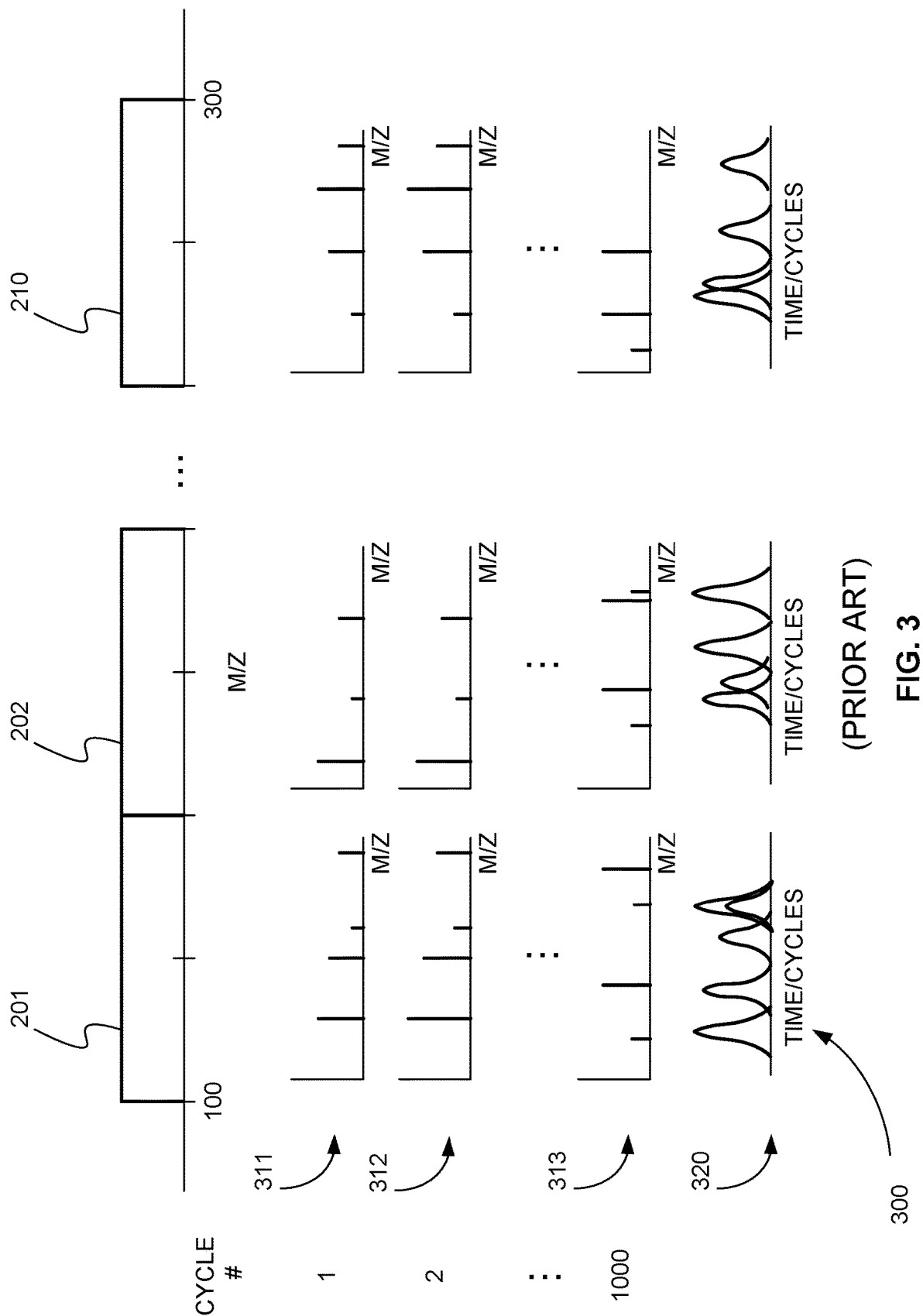
FIG. 3 is an exemplary diagram that graphically depicts the steps for obtaining product ion traces or extracted ion chromatograms (XICs) from each precursor ion mass selection window during each cycle of a DIA workflow.
Figure 4:
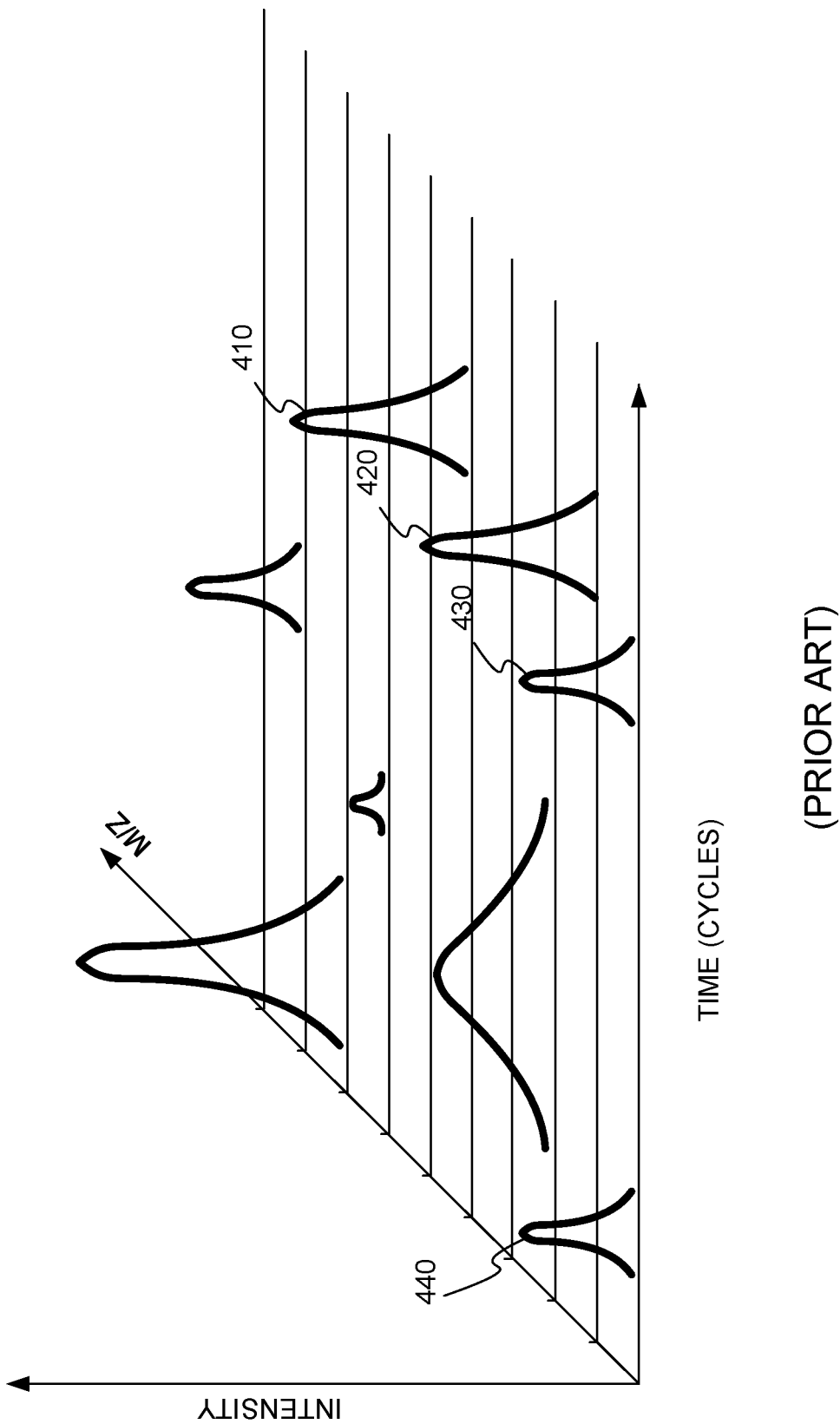
FIG. 4 is an exemplary diagram that shows the three-dimensionality of product ion XICs obtained for a precursor ion mass selection window over time.
Figure 5:
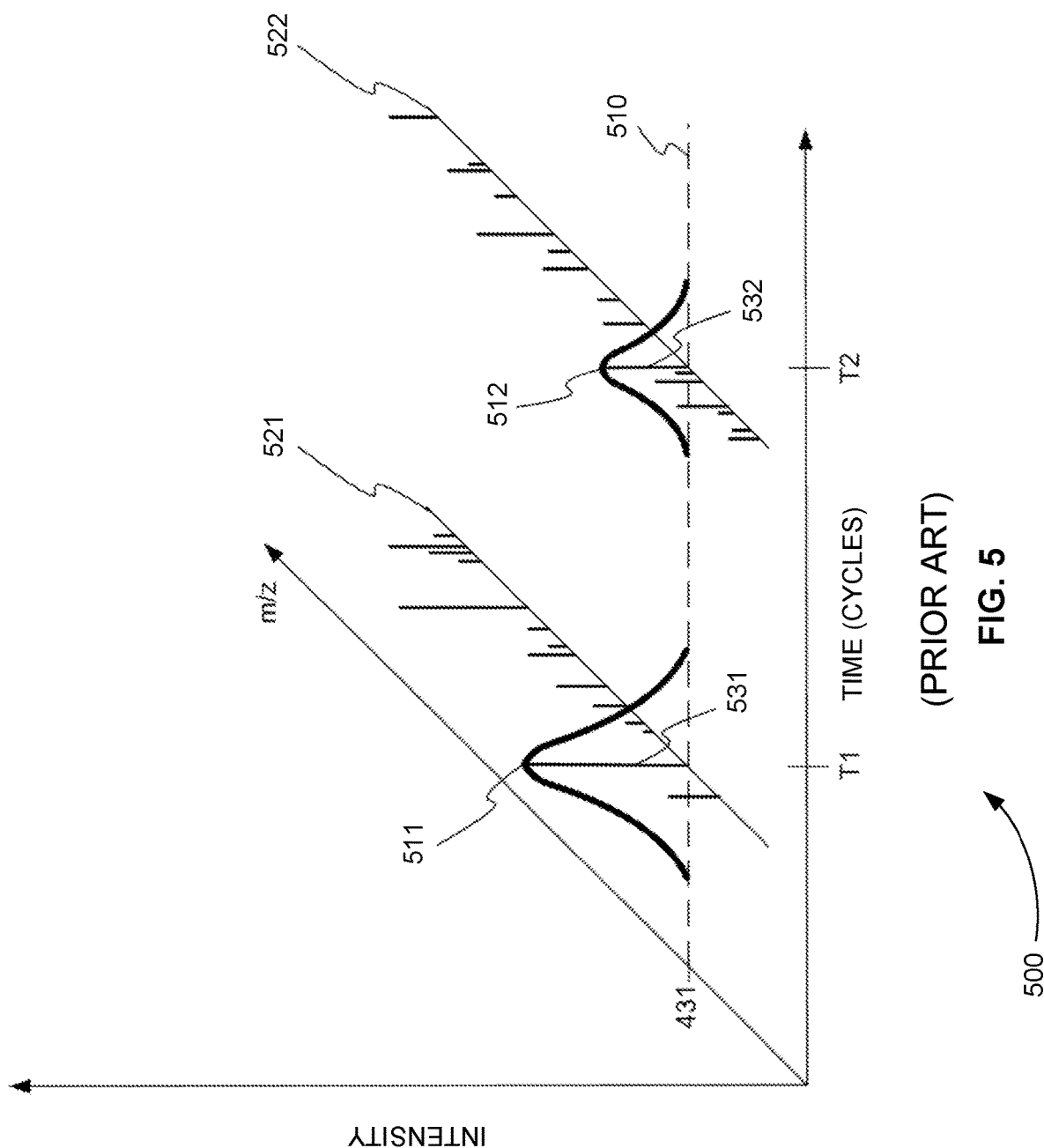
FIG. 5 is an exemplary diagram that shows how the method of the '874 Application can resolve the retention time ambiguity in complex mixtures.

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Systems and Methods for Retention Time Verification

As described above, the method of the '874 Application is directed to resolving the retention time ambiguity when two or more XIC peaks are found for the same product ion m/z value. The method compares the values of one or more ion characteristics of the m/z peaks of the mass spectra obtained for the two or more XIC peaks to known values for the product ion.

The method of the '481 Application is directed to determining if an XIC peak found from the method of the '874 Application is actually from the known target compound. The method compares the XIC peak to other XIC peaks of other product ions thought to be from the known target compound using curve subtraction.

The methods of the '874 Application and the '481 Application greatly improve the identification and quantification of known compounds in complex samples. However, these and other methods are directed to measuring a single known compound. Unfortunately, it is known that compounds may exist in many forms which are artifacts created during the processing. The problem is that these compounds reduce the limit of detection of the different targets compounds and also provide interferences limiting the ability to see what is really changing in the sample. As a result, systems and methods are needed that can take into account the presence of adducts, modified forms, or peptides of a compound being identified or quantified in a complex sample.

In various embodiments, information about adducts, modified forms, or peptides of a known compound is used to improve the identification or quantification of the known compound. In particular, this information is used to verify the retention time of the known compound.

An adduct is, for example, is a compound formed from two different compounds such that there is no loss in atoms from either of the two different compounds, due the formation. So an adduct of a known compound is a compound formed from the known compound and another added compound such that here is no loss in atoms from either the known compound or the added compound.

A modified form of a compound is, for example, a version of the compound that has experienced the addition or subtraction of molecules due to a chemical reaction. So modified form of a known compound is a version of the known compound that has experienced the addition or subtraction of molecules due to a chemical reaction.

A peptide is, for example, is a portion of a protein. It is a molecule consisting of up to 50 amino acids. In contrast, a protein usually consists of 50 or more amino acids. More specifically, some researchers refer to a protein as one or more polypeptides, which are chains of 50 or more amino acids, and refers to peptides as oligopeptides, which have 50 or fewer amino acids. So a peptide of a known compound is a portion of the known compound or protein consisting of fewer amino acids than the known compound or protein.

Using the methods of the '874 Application and the '481 Application for the scoring of multiple XIC traces for the identification of a compound, a method for the detection and quantification of the adducts, modified forms, or peptides for different compounds is undertaken. This method includes the development and use of a compound centric database covering the range of different compounds which are available. This database is essentially a series of spectra and elution times relative to the parent or canonical forms of the compound. This database includes, for example, all forms of each target compound.

Further, this method includes mapping the compounds in multiple dimensions where one dimension is the parent m/z and another is the time offset, where the time is a function of a separation device, such as liquid chromatography (LC) or differential ion mobility spectrometry (DMS).

For example, in a complex sample, a known compound, A, is present as well as $A^{2+}$, $A^{3+}$, $A^{-H2O}$, and $A^{+NH3}$. In various embodiments, the retention time (RT) is identified for each form from a database or library. This database or library is the compound centric database described above. This database or library is created by performing separate separation and mass spectrometry experiments on standard samples containing just one form of each compound, for example. In each experiment, mass spectra and retention times are measured for the product ions of each form of each compound. In alternative embodiments, this database or library is created from previous experiments.

The complex sample is separated using a separation device and mass analyzed using a mass spectrometer. The mass analysis is performed using SWATH™, for example. All of the XIC's are extracted from the mass spectra for each of the product ions of each of the five forms of compound A using the database or library.

FIG. 12 is an exemplary plot 1200 of the product ion XIC peaks found for form $A^{2+}$ of the known compound A from a complex sample, in accordance with various embodiments. XIC peaks 1210, 1211, 1212, 1213, and 1214 are extracted for form $A^{2+}$. These XIC peaks are scored to confirm whether or not form $A^{2+}$ is present in the complex sample.

For example, XIC peaks 1210 and 1211 are scored using the method of the '874 Application to resolve the ambiguity between these peaks. This method determines that XIC peak 1211 is the more likely product ion peak for the form $A^{2+}$ of the known compound.

Also, XIC peaks 1211, 1212, 1213, and 1214 are scored and grouped using the method of the '481 Application to confirm that they are from the same compound. From this scoring and grouping it is found that all of XIC peaks 1211, 1212, 1213, and 1214 are from form $A^{2+}$ of the compound and, therefore, are all part of the peak group. A peak of the peak group with the highest score can be used to represent the peak group. For example, XIC peak 1212 can be used to represent the peak group for form $A^{2+}$ of the compound. XIC peak 1212 can then be referred to as the score curve for form $A^{2+}$ of the compound.

The score curve is calculated for each form of the compound found in the complex sample. For example, if all five forms of compound A are found in the complex sample, then five score curves are calculated.

FIG. 13 is an exemplary plot 1300 of the product ion XIC score curves found for each of the five forms of the known compound A found in a complex sample, in accordance with various embodiments. XIC peak score curves 1310, 1320, 1330, 1340, and 1350 are calculated for forms A, $A^{2+}$, $A^{3+}$, $A^{-H2O}$, and $A^{30\ NH3}$ of the known compound, respectively. From the compound centric database or library, the expected retention time of each form is obtained. Using these expected retention times, the score curves 1320, 1330, 1340, and 1350 can be shifted by the expected retention time offsets to align the score curves with the expected retention time of the canonical form A of the compound.

FIG. 14 is an exemplary plot 1400 of the product ion score curves found for each of the five forms of the known compound A shifted by the expected retention time offsets to align the score curves with the expected retention time of the canonical form A of the compound, in accordance with various embodiments. Score curves 1320, 1330, 1340, and 1350 for forms $A^{2+}$, $A^{3+}$, $A^{-H2O}$, and $A^{+NH3}$ of the known compound, respectively, are aligned with the expected retention time of the canonical form A of the compound. Score curve 1310 is the measured score curve for the canonical form A of the compound.

A comparison of the shifted retention time of one or more of score curves 1320, 1330, 1340, and 1350 with the retention time of score curve 1310 is used to verify the identity of compound A. For example, if the shifted retention time of one or more of score curves 1320, 1330, 1340, and 1350 is within a retention time threshold of the retention time of score curve 1310 of the known compound, then the identity of compound A is confirmed.

In various embodiments, the score curves of forms of the known compound can be compared in various ways. For instance, using the canonical form as an anchor, or the most likely form, the similarity of the score curves from multiple forms is determined. For example, performing the similarity pairwise allows for the shifting of the non-anchored score curve and determination if the score curve peak apex is within the same RT space—should all be aligned with zero delta. Using the resulting offset of the pairwise comparison maxima to zero time results in an individual score for each form. A final score is then composed from each of the individual delta time scores as well as the original identification score.

Such a scoring system could be used for the identification of multiple charges and used to augment current scoring systems. Such a system could also provide an overall confidence measure of the compound identification. Such a system could also be used to provide a single weighted area for the canonical compound in the sample. Such a system may also be able to identify compounds using just the RT offset of the different forms from each other and use this to provide an overall confidence for a higher level item (protein/pathway etc.) which is present in the sample.

System for Verifying the Retention Time of a Compound

FIG. 15 is a schematic diagram of a system 1500 for verifying the retention time of a known compound using an adduct, modified form, or peptide of the known compound, in accordance with various embodiments. System 1500 includes includes separation device 1510, mass spectrometer 1520, database 1530, and processor 1540. Separation device 1510 separates a known compound and at least one adduct, modified form, or peptide of the known compound from a sample mixture. Separation device 1510 can include, but is not limited to, an electrophoretic device, a chromatographic device, a differential ion mobility spectrometry (DMS) device, or other mobility device.

Mass spectrometer 1520 is a tandem mass spectrometer, for example. Mass spectrometer 1520 can include one or more physical mass analyzers that perform two or more mass analyses. A mass analyzer of a tandem mass spectrometer can include, but is not limited to, a time-of-flight (TOF), quadrupole, an ion trap, a linear ion trap, an orbitrap, a magnetic four-sector mass analyzer, a hybrid quadrupole time-of-flight (Q-TOF) mass analyzer, or a Fourier transform mass analyzer. Mass spectrometer 1520 can include separate mass spectrometry stages or steps in space or time, respectively.

Mass spectrometer 1520 performs at each retention time of a plurality of retention times one or more mass spectrometry/mass spectrometry (MS/MS) scans on the separating sample mixture using one or more sequential mass window widths in order to span an entire mass range, producing a collection of product ion spectra for the entire mass range for the plurality of retention times.

Database 1530 can include magnetic or electronic storage. Database 1530 can be part of a memory for processor 1540 or it can be a separate memory. Database 1530 can include software components in addition to hardware components. Database 1530 is a collection of information organized in order to allow that information to more easily be searched. The collection of information in database 1530 includes expected retention times and expected product ion mass spectra for the product ions of the known compound and the at least one adduct, modified form, or peptide of the known compound.

Processor 1540 is in communication with mass spectrometer 1520 and database 1530. Processor 1540 can also be in communication with separation device 1510. Processor 1540 can be, but is not limited to, the system of FIG. 1, a computer, microprocessor, or any device capable of sending and receiving control signals and data to and from tandem mass spectrometer 1520 and processing data.

Processor 1540 receives the collection of product ion spectra for the entire mass range for the plurality of retention times from mass spectrometer 1520. Processor 1540 selects M product ions of the known compound using database 1530. Processor 1540 calculates an XIC for each of the M product ions from the collection of product ion spectra, producing M XICs. Processor 1540 calculates a first XIC peak group that represents the known compound from the M XICs using curve subtraction. Processor 1540 selects a first XIC peak of the first XIC peak group that represents the known compound.

Processor 1540 selects L product ions of the at least one adduct, modified form, or peptide of the known compound using database 1530. Processor 1540 calculates an XIC for each of the L product ions from the collection of product ion spectra, producing L XICs. Processor 1540 calculates a second XIC peak group that represents the at least one adduct, modified form, or peptide of the known compound from the L XICs using curve subtraction. Processor 1540 selects a second XIC peak of the second XIC peak group that represents the at least one adduct, modified form, or peptide of the known compound.

Processor 1540 shifts the retention time of the second XIC peak by the difference between the expected retention time of the first XIC peak found from database 1530 and the expected retention time of the second XIC peak found from database 1530. Processor 1540 verifies that the retention time of the first XIC peak is the retention time of the known compound if the shifted retention time of the second XIC peak is within a retention time threshold of the retention time of the first XIC peak. The retention time threshold can be predetermined or received from a user, for example.

In various embodiments, the known compound is a known protein.

In various embodiments, processor 1540 further compares the similarity of the first XIC peak and the second XIC peak and scores the first XIC peak and the second XIC peak based on the similarity.

In various embodiments, processor 1540 calculates the first XIC peak group that represents the known compound from the M XICs using curve subtraction by performing the following steps. Processor 1540 subtracts each XIC of the M XICs from each of the other M XICs, producing $$\binom{M}{2}$$

subtraction curves. Each subtraction curve is calculated from a first XIC and a second XIC. At each retention time, the intensity of the first XIC at the retention time and two or more intensities of the first XIC at two or more adjacent retention times are normalized. Similarly, the intensity of the second XIC at the retention time and two or more intensities of the second XIC at the adjacent retention times are normalized. The normalized intensities of the second XIC are subtracted from the corresponding normalized intensities of the first XIC. A statistical measure of the difference intensities is calculated. The statistical measure can include, but is not limited to, a mean, mode, median, variance, or standard deviation of the difference intensities.

Processor 1540 identifies at least one region of one or more retention times where one or more subtraction curves of the $$\binom{M}{2}$$

subtraction curves have values that are within a threshold value of zero. The threshold can be predetermined or received from a user, for example. For the at least one region, processor 1504 obtains two or more XICs used to calculate the one or more subtraction curves identifying the region and adds each peak of the two or more XICs that is in the region to the first XIC peak group.

In various embodiments, at each retention time, i+m, Processor 1540 calculates a mean, $\mu_{i+m}$, of the difference intensities according to $$\mu_{i+m} = \frac{1}{N}\sum_{j=1}^{N}\left(\left(\frac{a_{i+j}}{a_{i+m}}\right)^{\frac{1}{2}} - \left(\frac{b_{i+j}}{b_{i+m}}\right)^{\frac{1}{2}}\right),$$

where N is the number of difference intensities calculated at each retention time, N is an odd number, m is the midpoint of N, and $$\left(\frac{a_{i+j}}{a_{i+m}}\right)^{\frac{1}{2}} - \left(\frac{b_{i+j}}{b_{i+m}}\right)^{\frac{1}{2}}$$

for j=1 to N are the difference intensities calculated for retention time i+m.

In various embodiments, at each retention time, i+m, processor 1540 calculates a standard deviation, $\sigma_{i+m}$, of the difference intensities according to $$\sigma_{i+m} = \sqrt{\sum_{j=1}^{N}\frac{1}{N}\left(\left(\frac{a_{i+j}}{a_{i+m}}\right)^{\frac{1}{2}} - \left(\frac{b_{i+j}}{b_{i+m}}\right)^{\frac{1}{2}} - \mu_{i+m}\right)^{2}},$$

where N is the number of difference intensities calculated at each retention time, N is an odd number, m is the midpoint of N, $$\left(\frac{a_{i+j}}{a_{i+m}}\right)^{\frac{1}{2}} - \left(\frac{b_{i+j}}{b_{i+m}}\right)^{\frac{1}{2}}$$

for j=1 to N are the difference intensities calculated for retention time i+m, and $\mu_{i+m}$ is the mean calculated according to $$\mu_{i+m} = \frac{1}{N}\sum_{j=1}^{N}\left(\left(\frac{a_{i+j}}{a_{i+m}}\right)^{\frac{1}{2}} - \left(\frac{b_{i+j}}{b_{i+m}}\right)^{\frac{1}{2}}\right).$$

In various embodiments, processor 1540 calculates the second XIC peak group that represents the at least one adduct, modified form, or peptide of the known compound from the L XICs using curve subtraction by performing the following steps. Processor 1540 subtracts each XIC of the L XICs from each of the other L XICs, producing $$\binom{L}{2}$$

subtraction curves. Each subtraction curve is calculated from a first XIC and a second XIC. At each retention time, the intensity of the first XIC at the retention time and two or more intensities of the first XIC at two or more adjacent retention times are normalized. Similarly, the intensity of the second XIC at the retention time and two or more intensities of the second XIC at the adjacent retention times are normalized. The normalized intensities of the second XIC are subtracted from the corresponding normalized intensities of the first XIC. A statistical measure of the difference intensities is calculated. The statistical measure can include, but is not limited to, a mean, mode, median, variance, or standard deviation of the difference intensities.

Processor 1540 identifies at least one region of one or more retention times where one or more subtraction curves of the $$\binom{L}{2}$$

subtraction curves have values that are within a threshold value of zero. The threshold can be predetermined or received from a user, for example. For the at least one region, processor 1540 obtains two or more XICs used to calculate the one or more subtraction curves identifying the region and adds each peak of the two or more XICs that is in the region to the second XIC peak group.

In various embodiments, at each retention time, i+m, Processor 1540 calculates a mean, $\mu_{i+m}$, of the difference intensities according to $$\mu_{i+m} = \frac{1}{N}\sum_{j=1}^{N}\left(\left(\frac{a_{i+j}}{a_{i+m}}\right)^{\frac{1}{2}} - \left(\frac{b_{i+j}}{b_{i+m}}\right)^{\frac{1}{2}}\right).$$

where N is the number of difference intensities calculated at each retention time, N is an odd number, m is the midpoint of N, and $$\left(\frac{a_{i+j}}{a_{i+m}}\right)^{\frac{1}{2}} - \left(\frac{b_{i+j}}{b_{i+m}}\right)^{\frac{1}{2}}$$

for j=1 to N are the difference intensities calculated for retention time i+m.

In various embodiments, at each retention time, i+m, processor 1540 calculates a standard deviation, $\sigma_{i+m}$, of the difference intensities according to $$\sigma_{i+m} = \sqrt{\sum_{j=1}^{N}\frac{1}{N}\left(\left(\frac{a_{i+j}}{a_{i+m}}\right)^{\frac{1}{2}} - \left(\frac{b_{i+j}}{b_{i+m}}\right)^{\frac{1}{2}} - \mu_{i+m}\right)^{2}},$$

where N is the number of difference intensities calculated at each retention time, N is an odd number, m is the midpoint of N, $$\left(\frac{a_{i+j}}{a_{i+m}}\right)^{\frac{1}{2}} - \left(\frac{b_{i+j}}{b_{i+m}}\right)^{\frac{1}{2}}$$

for j=1 to N are the difference intensities calculated for retention time i+m, and $\mu_{i+m}$ is the mean calculated according to $$\mu_{i+m} = \frac{1}{N}\sum\nolimits_{j=1}^{N}\left(\left(\frac{a_{i+j}}{a_{i+m}}\right)^{\frac{1}{2}} - \left(\frac{b_{i+j}}{b_{i+m}}\right)^{\frac{1}{2}}\right).$$

Method for Verifying the Retention Time of a Compound

FIG. 16 is a flowchart showing a method 1600 for verifying the retention time of a known compound using an adduct, modified form, or peptide of the known compound, in accordance with various embodiments.

In step 1605 of method 1600, a collection of product ion spectra for an entire mass range for a plurality of retention times is obtained. A known compound and at least one adduct, modified form, or peptide of the known compound are separated from a sample mixture using a separation device. One or more mass MS/MS scans are performed on the separating sample mixture at each retention time of a plurality of retention times using one or more sequential precursor ion mass window widths in order to span the entire mass range, producing the collection of product ion spectra for the entire mass range for the plurality of retention times using a mass spectrometer.

In step 1610, M product ions of the known compound are selected using a processor. The M product ions are selected using a database that includes expected retention times and expected product ion mass spectra for the product ions of the known compound and the at least one adduct, modified form, or peptide of the known compound.

In step 1615, an XIC is calculated for each of the M product ions from the collection of product ion spectra using the processor, producing M XICs.

In step 1620, a first XIC peak group is calculated that represents the known compound from the M XICs using curve subtraction using the processor.

In step 1625, a first XIC peak of the first XIC peak group is selected that represents the known compound using the processor.

In step 1630, L product ions of the at least one adduct, modified form, or peptide of the known compound are selected using the processor. The L product ions are also selected using the database.

In step 1635, an XIC is calculated for each of the L product ions from the collection of product ion spectra using the processor, producing L XICs.

In step 1640, a second XIC peak group is calculated that represents the at least one adduct, modified form, or peptide of the known compounds using the processor from the L XICs using curve subtraction using the processor.

In step 1645, a second XIC peak of the second XIC peak group is selected that represents the at least one adduct, modified form, or peptide of the known compound using the processor.

In step 1650, the retention time of the second XIC peak is shifted by the difference between the expected retention time of the first XIC peak found from the database and the expected retention time of the second XIC peak found from the database using the processor.

In step 1655, the retention time of the first XIC peak is verified as the retention time of the known compound if the shifted retention time of the second XIC peak is within a retention time threshold of the retention time of the first XIC peak using the processor.

Computer Program Product for Verifying the Retention Time of a Compound

In various embodiments, computer program products include a tangible computer-readable storage medium whose contents include a program with instructions being executed on a processor so as to perform a method for verifying the retention time of a known compound using an adduct, modified form, or peptide of the known compound. This method is performed by a system that includes one or more distinct software modules.

FIG. 17 is a schematic diagram of a system 1700 that includes one or more distinct software modules that performs a method for verifying the retention time of a known compound using an adduct, modified form, or peptide of the known compound, in accordance with various embodiments. System 1700 includes measurement module 1710 and analysis module 1720.

Measurement module 1710 obtains a collection of product ion spectra for an entire mass range for a plurality of retention times using the measurement module. A known compound and at least one adduct, modified form, or peptide of the known compound are separated from a sample mixture using a separation device. One or more mass spectrometry/mass spectrometry (MS/MS) scans are performed on the separating sample mixture at each retention time of a plurality of retention times using one or more sequential precursor ion mass window widths in order to span the entire mass range, producing the collection of product ion spectra for the entire mass range for the plurality of retention times using a mass spectrometer.

Analysis module 1720 selects M product ions of the known compound using a database. The database includes expected retention times and expected product ion mass spectra for the product ions of the known compound and the at least one adduct, modified form, or peptide of the known compound. Analysis module 1720 calculates an XIC for each of the M product ions from the collection of product ion spectra, producing M XICs. Analysis module 1720 calculates a first XIC peak group that represents the known compound from the M XICs using curve subtraction. Analysis module 1720 selects a first XIC peak of the first XIC peak group that represents the known compound.

Analysis module 1720 selects L product ions of the at least one adduct, modified form, or peptide of the known compound using the database. Analysis module 1720 calculates an XIC for each of the L product ions from the collection of product ion spectra, producing L XICs. Analysis module 1720 calculates a second XIC peak group that represents the at least one adduct, modified form, or peptide of the known compound from the L XICs using curve subtraction. Analysis module 1720 selects a second XIC peak of the second XIC peak group that represents the at least one adduct, modified form, or peptide of the known compound.

Analysis module 1720 shifts the retention time of the second XIC peak by the difference between the expected retention time of the first XIC peak found from the database and the expected retention time of the second XIC peak found from the database. Finally, analysis module 1720 verifies that the retention time of the first XIC peak is the retention time of the known compound if the shifted retention time of the second XIC peak is within a retention time threshold of the retention time of the first XIC peak.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for verifying the retention time of a known compound using an adduct, modified form, or peptide of the known compound, comprising:
    a separation device that separates a known compound and at least one adduct, modified form, or peptide of the known compound from a sample mixture;
    a mass spectrometer that performs at each retention time of a plurality of retention times one or more mass spectrometry/mass spectrometry (MS/MS) scans on the separating sample mixture using one or more sequential mass window widths in order to span an entire mass range, producing a collection of product ion spectra for the entire mass range for the plurality of retention times;
    a database that includes expected retention times and expected product ion mass spectra for the product ions of the known compound and the at least one adduct, modified form, or peptide of the known compound; and
    a processor that
        receives the collection of product ion spectra for the entire mass range for the plurality of retention times,
        selects M product ions of the known compound using the database,
        calculates an extracted ion chromatogram (XIC) for each of the M product ions from the collection of product ion spectra, producing M XICs,
        calculates a first XIC peak group that represents the known compound from the M XICs using curve subtraction,
        selects a first XIC peak of the first XIC peak group that represents the known compound;
        selects L product ions of the at least one adduct, modified form, or peptide of the known compound using the database,
        calculates an XIC for each of the L product ions from the collection of product ion spectra, producing L XICs,
        calculates a second XIC peak group that represents the at least one adduct, modified form, or peptide of the known compound from the L XICs using curve subtraction,
        selects a second XIC peak of the second XIC peak group that represents the at least one adduct, modified form, or peptide of the known compound,
        shifts the retention time of the second XIC peak by the difference between the expected retention time of the first XIC peak found from the database and the expected retention time of the second XIC peak found from the database, and
        verifies that the retention time of the first XIC peak is the retention time of the known compound if the shifted retention time of the second XIC peak is within a retention time threshold of the retention time of the first XIC peak.

2. The system of claim 1, wherein the processor further compares the similarity of the first XIC peak and the second XIC peak and scores the first XIC peak and the second XIC peak based on the similarity.

3. The system of claim 1, wherein the processor calculates the first XIC peak group that represents the known compound from the M XICs using curve subtraction by
    subtracting each XIC of the M XICs from each of the other M XICs, producing $$\binom{M}{2}$$

subtraction curves, wherein each subtraction curve is calculated from a first XIC and a second XIC by, at each retention time, normalizing an intensity of the first XIC at the each retention time and two or more intensities of the first XIC at two or more adjacent retention times, normalizing an intensity of the second XIC at the each retention time and two or more intensities of the second XIC at the adjacent retention times, subtracting the normalized intensities of the second XIC from the corresponding normalized intensities of the first XIC, and calculating a statistical measure of the difference intensities,
    identifying at least one region of one or more retention times where one or more subtraction curves of the $$\binom{M}{2}$$

subtraction curves have values that are within a threshold value of zero, and
    for the at least one region, obtaining two or more XICs used to calculate the one or more subtraction curves identifying the region and adding each peak of the two or more XICs that is in the region to the first XIC peak group.

4. The system of claim 3, wherein calculating a statistical measure of the difference intensities comprises calculating a mean of the difference intensities.

5. The system of claim 4, wherein the mean, $\mu_{i+m}$, of the difference intensities calculated for retention time i+m is calculated according to $$\mu_{i+m} = \frac{1}{N}\sum_{j=1}^{N}\left(\left(\frac{a_{i+j}}{a_{i+m}}\right)^{\frac{1}{2}} - \left(\frac{b_{i+j}}{b_{i+m}}\right)^{\frac{1}{2}}\right),$$

where N is the number of difference intensities calculated at each retention time, N is an odd number, m is the midpoint of N, and $$\left(\frac{a_{i+j}}{a_{i+m}}\right)^{\frac{1}{2}} - \left(\frac{b_{i+j}}{b_{i+m}}\right)^{\frac{1}{2}}$$

for j=1 to N are the difference intensities calculated for retention time i+m.

6. The system of claim 3, wherein calculating a statistical measure of the difference intensities comprises calculating a standard deviation of the difference intensities.

7. The system of claim 6, wherein the standard deviation, $\sigma_{i+m}$, of the difference intensities calculated for retention time, i+m, is calculated according to $$\sigma_{i+m} = \sqrt{\sum_{j=1}^{N} \frac{1}{N}\left(\left(\frac{a_{i+j}}{a_{i+m}}\right)^{\frac{1}{2}} - \left(\frac{b_{i+j}}{b_{i+m}}\right)^{\frac{1}{2}} - \mu_{i+m}\right)^2},$$

where N is the number of difference intensities calculated at each retention time, N is an odd number, m is the midpoint of N, $$\left(\frac{a_{i+j}}{a_{i+m}}\right)^{\frac{1}{2}} - \left(\frac{b_{i+j}}{b_{i+m}}\right)^{\frac{1}{2}}$$

for j=1 to N are the difference intensities calculated for retention time, i+m, and $\mu_{i+m}$ is the mean calculated according to $$\mu_{i+m} = \frac{1}{N}\sum_{j=1}^{N}\left(\left(\frac{a_{i+j}}{a_{i+m}}\right)^{\frac{1}{2}} - \left(\frac{b_{i+j}}{b_{i+m}}\right)^{\frac{1}{2}}\right).$$

8. The system of claim 3, wherein calculating a statistical measure of the difference intensities comprises calculating one of the median, mode, or variance of the difference intensities.

9. The system of claim 1, wherein the processor calculates the second XIC peak group that represents the at least one adduct, modified form, or peptide of the known compound from the L XICs using curve subtraction by subtracting each XIC of the L XICs from each of the other L XICs, producing $$\binom{L}{2}$$

subtraction curves, wherein each subtraction curve is calculated from a first XIC and a second XIC by, at each retention time, normalizing an intensity of the first XIC at the each retention time and two or more intensities of the first XIC at two or more adjacent retention times, normalizing an intensity of the second XIC at the each retention time and two or more intensities of the second XIC at the adjacent retention times, subtracting the normalized intensities of the second XIC from the corresponding normalized intensities of the first XIC, and calculating a statistical measure of the difference intensities, identifying at least one region of one or more retention times where one or more subtraction curves of the $$\binom{L}{2}$$

subtraction curves have values that are within a threshold value of zero, and for the at least one region, obtaining two or more XICs used to calculate the one or more subtraction curves identifying the region and adding each peak of the two or more XICs that is in the region to the second XIC peak group.

10. The system of claim 9, wherein calculating a statistical measure of the difference intensities comprises calculating a mean of the difference intensities.

11. The system of claim 10, wherein the mean, $\mu_{i+m}$, of the difference intensities calculated for retention time i+m is calculated according to $$\mu_{i+m} = \frac{1}{N}\sum_{j=1}^{N}\left(\left(\frac{a_{i+j}}{a_{i+m}}\right)^{\frac{1}{2}} - \left(\frac{b_{i+j}}{b_{i+m}}\right)^{\frac{1}{2}}\right),$$

where N is the number of difference intensities calculated at each retention time, N is an odd number, m is the midpoint of N, and $$\left(\frac{a_{i+j}}{a_{i+m}}\right)^{\frac{1}{2}} - \left(\frac{b_{i+j}}{b_{i+m}}\right)^{\frac{1}{2}}$$

for j=1 to N are the difference intensities calculated for retention time i+m.

12. The system of claim 9, wherein calculating a statistical measure of the difference intensities comprises calculating a standard deviation of the difference intensities.

13. The system of claim 12, wherein the standard deviation, $\sigma_{i+m}$, of the difference intensities calculated for retention time, i+m, is calculated according to $$\sigma_{i+m} = \sqrt{\sum_{j=1}^{N} \frac{1}{N}\left(\left(\frac{a_{i+j}}{a_{i+m}}\right)^{\frac{1}{2}} - \left(\frac{b_{i+j}}{b_{i+m}}\right)^{\frac{1}{2}} - \mu_{i+m}\right)^2},$$

where N is the number of difference intensities calculated at each retention time, N is an odd number, m is the midpoint of N, $$\left(\frac{a_{i+j}}{a_{i+m}}\right)^{\frac{1}{2}} - \left(\frac{b_{i+j}}{b_{i+m}}\right)^{\frac{1}{2}}$$

for j=1 to N are the difference intensities calculated for retention time, i+m, and $\mu_{i+m}$ is the mean calculated according to $$\mu_{i+m} = \frac{1}{N}\sum_{j=1}^{N}\left(\left(\frac{a_{i+j}}{a_{i+m}}\right)^{\frac{1}{2}} - \left(\frac{b_{i+j}}{b_{i+m}}\right)^{\frac{1}{2}}\right).$$

14. A method for verifying the retention time of a known compound using an adduct, modified form, or peptide of the known compound, comprising:
- obtaining a collection of product ion spectra for an entire mass range for a plurality of retention times, wherein a known compound and at least one adduct, modified form, or peptide of the known compound are separated from a sample mixture using a separation device and wherein one or more mass spectrometry/mass spectrometry (MS/MS) scans are performed on the separating sample mixture at each retention time of a plurality of retention times using one or more sequential precursor ion mass window widths in order to span the entire mass range, producing the collection of product ion spectra for the entire mass range for the plurality of retention times using a mass spectrometer;
- selecting M product ions of the known compound using a database that includes expected retention times and expected product ion mass spectra for the product ions of the known compound and the at least one adduct, modified form, or peptide of the known compound using a processor;
- calculating an extracted ion chromatogram (XIC) for each of the M product ions from the collection of product ion spectra using the processor, producing M XICs;
- calculating a first XIC peak group that represents the known compound from the M XICs using curve subtraction using the processor;
- selecting a first XIC peak of the first XIC peak group that represents the known compound using the processor;
- selecting L product ions of the at least one adduct, modified form, or peptide of the known compound using the database using the processor;
- calculating an XIC for each of the L product ions from the collection of product ion spectra using the processor, producing L XICs;
- calculating a second XIC peak group that represents the at least one adduct, modified form, or peptide of the known compound from the L XICs using curve subtraction using the processor;
- selecting a second XIC peak of the second XIC peak group that represents the at least one adduct, modified form, or peptide of the known compound using the processor;
- shifting the retention time of the second XIC peak by the difference between the expected retention time of the first XIC peak found from the database and the expected retention time of the second XIC peak found from the database using the processor; and
- verifying that the retention time of the first XIC peak is the retention time of the known compound if the shifted retention time of the second XIC peak is within a retention time threshold of the retention time of the first XIC peak using the processor.

15. A computer program product, comprising a non-transitory and tangible computer-readable storage medium whose contents include a program with instructions being executed on a processor so as to perform a method for verifying the retention time of a known compound using an adduct, modified form, or peptide of the known compound, the method comprising:
- providing a system, wherein the system comprises one or more distinct software modules, and wherein the distinct software modules comprise a measurement module and an analysis module;
- obtaining a collection of product ion spectra for an entire mass range for a plurality of retention times using the measurement module, wherein a known compound and at least one adduct, modified form, or peptide of the known compound are separated from a sample mixture using a separation device and wherein one or more mass spectrometry/mass spectrometry (MS/MS) scans are performed on the separating sample mixture at each retention time of a plurality of retention times using one or more sequential precursor ion mass window widths in order to span the entire mass range, producing the collection of product ion spectra for the entire mass range for the plurality of retention times using a mass spectrometer;
- selecting M product ions of the known compound using a database that includes expected retention times and expected product ion mass spectra for the product ions of the known compound and the at least one adduct, modified form, or peptide of the known compound using the analysis module;
- calculating an extracted ion chromatogram (XIC) for each of the M product ions from the collection of product ion spectra using the analysis module, producing M XICs;
- calculating a first XIC peak group that represents the known compound from the M XICs using curve subtraction using the analysis module;
- selecting a first XIC peak of the first XIC peak group that represents the known compound using the analysis module;
- selecting L product ions of the at least one adduct, modified form, or peptide of the known compound using the database using the analysis module;
- calculating an XIC for each of the L product ions from the collection of product ion spectra using the analysis module, producing L XICs;
- calculating a second XIC peak group that represents the at least one adduct, modified form, or peptide of the known compound from the L XICs using curve subtraction using the analysis module;
- selecting a second XIC peak of the second XIC peak group that represents the at least one adduct, modified form, or peptide of the known compound using the analysis module;
- shifting the retention time of the second XIC peak by the difference between the expected retention time of the first XIC peak found from the database and the expected retention time of the second XIC peak found from the database using the analysis module; and
- verifying that the retention time of the first XIC peak is the retention time of the known compound if the shifted retention time of the second XIC peak is within a retention time threshold of the retention time of the first XIC peak using the analysis module.

* * * * *